Patented Oct. 10, 1950

2,524,889

UNITED STATES PATENT OFFICE 2,524,889

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 26, 1948, Serial No. 35,524

11 Claims. (Cl. 252—331)

This invention relates to processes or procedures particularly adapted for preventing, breaking or resolving emulsions of the water-in-oil type, and particularly petroleum emulsions. This application is in part a continuation of our co-pending application Serial No. 666,822, filed May 2, 1946, now abandoned.

Complementary to the above aspect of our invention is our companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See our co-pending application Serial No. 35,525, filed June 26, 1948, which, in turn, is a continuation of our co-pending application Serial No. 758,489, filed July 1, 1947, now abandoned.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component. Reference is made to our co-pending applications Serial Nos. 8722 and 8723, both filed February 16, 1948, now Patents Nos. 2,499,365 and 2,499,366, both dated March 7, 1950.

For the sake of convenience and in order to indicate with clarity the relationship between the compounds herein employed as demulsifying agents in relation to other compounds employed for the same purpose and described in our last two mentioned co-pending applications, to wit, Serial No. 8,722 and 8,723, reference is made to still another of our co-pending applications, to wit, Serial No. 8,731, also filed February 16, 1948, now abandoned. In this last mentioned co-pending application we have stated as follows:

"We have found that if solvent-soluble resins are prepared from difunctional (direactive) phenols, in which one of the reactive (o or p) positions of the phenol is substituted by a hydrocarbon radical having 4 to 8 carbon atoms, in the substantial absence of trifunctional phenols, and aldehydes having not over 8 carbon atoms, subsequent oxyalkylation, and specifically oxyethylation, yields products of unusual value for demulsification purposes, provided oxyalkylation is continued to the degree that hydrophile properties are imparted to the compound. By 'substantial absence of trifunctional phenols,' we mean that such materials may be present only in amounts so small that they do not interfere with the formation of a solvent-soluble resin product, and especially, of a hydrophile oxyalkylated derivative thereof. The actual amounts to be tolerated will, of course, vary with the nature of the other components of the system; but in general, the proportion of trifunctional phenols which is tolerable in the conventional resinification procedures illustrated herein is quite small. In experiments following conventional procedure using an acid catalyst in which we have included trifunctional phenols in amounts of from 3% to about 1% or somewhat less, based on the difunctional phenols, we have encountered difficulties in preparing oxyalkylated derivatives of the type useful in the practice of this invention.

"Such products are rarely a single chemical compound, but are almost invariably a mixture of cogeners. One useful type of compound may be exemplified in an idealized simplification in the following formula:

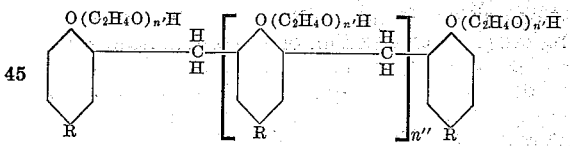

which, in turn, is considered a derivative of the fusible, organic solvent-soluble resin polymer

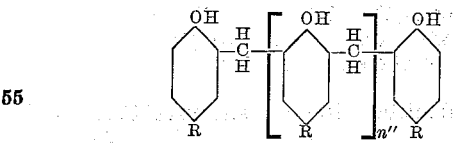

"In these formulae $n''$ represents a numeral varying from 1 to 13, or even more, provided the parent resin is fusible and organic solvent-soluble; $n'$ represents a numeral varying from 1 to 20, with the proviso that the average value of $n'$ be at least 2; and R is a hydrocarbon radical having at least 4 and not over 8 carbon atoms. These numerical values of $n'$ and $n''$ are, of course, on a statistical basis."

The demulsifying agents employed in the present process are similar to those described in our last aforementioned co-pending application, to wit, Serial No. 8,731, and are also obtained from solvent-soluble, fusible, phenol-aldehyde resins. The specific demulsifying agents herein specified are derived from phenols having a long chain meta substituent or the same type of phenol in combination with difunctional phenols, or in combination with trifunctional phenols free from a long chain meta substituent, or in combination with both of these other types of phenols.

Thus, in the simplest aspect in which oxyalkylated solvent-soluble fusible resins are derived from a long chain meta substituted phenol, such as anacardol, dihydroanacardol, tetrahydroanacardol, side chain chlorinated cardanol, etc., the compound may be exemplified in an idealized simplication in the following formula:

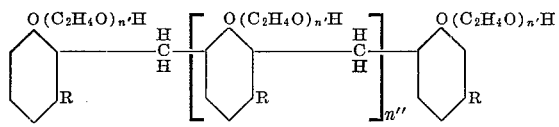

which, in turn, is considered a derivative of the fusible, organic solvent-soluble, resin polymer

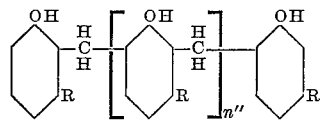

In these formulae $n''$ represents a numeral varying from 1 to 13, or even more, provided the parent resin is fusible and organic solvent-soluble; $n'$ represents a numeral varying from 1 to 20, with the proviso that the average value of $n'$ be at least 2; and R is a hydrocarbon radical, or a chlorinated hydrocarbon radical having 15 carbon atoms and derived from cashew nutshell liquid, with or without hydrogenation. These numerical values of $n'$ and $n''$ are, of course, on a statistical basis.

The present invention involves the use as a demulsifier of a hydrophile oxyalkylated organic solvent-soluble fusible phenol-aldehyde resin derived from an aldehyde having not more than 8 carbon atoms and a cashew nutshell liquid or a hydrogenated or chlorinated derivative thereof. Such resins may be obtained from such long chain meta substituted phenols alone or in combination with difunctional phenols, or in combination with trifunctional phenols free from a long chain meta position, or in combination with both such types. Such oxyalkylated phenol-aldehyde resins owe their hydrophile property to the fact that the ratio of oxyalkylated groups to phenolic nuclei is at least 2 to 1, and with the further limitation that the alkylene radicals of the oxyalkylene groups are ethylene, propylene, butylene, hydroxypropylene, or hydroxybutylene, corresponding to the alpha-beta alkylene oxides, ethylene oxides, alpha-beta propylene oxides, alpha-beta butylene oxides, glycide or methylglycide.

More particularly, the present invention involves the use, as a demulsifier, of a compound having the following characteristics:

(1) Essentially a polymer, probably linear but not necessarily so, having at least 3 and preferably not over 15 or 20 phenolic or structural units. It may have more, as previously noted.

(2) The parent resin polymer being fusible and organic solvent-soluble, as hereinafter described.

(3) The parent resin polymer being free from cross-linking, or structure which cross-links during the heating incident to the oxyalkylation procedure to an extent sufficient to prevent the possession of hydrophile or sub-surface-active or surface-active properties by the oxyalkylated resin. Minor proportions of trifunctional phenols sometimes present in commercial difunctional phenols are usually harmless.

(4) Each alkyleneoxy group is introduced at the phenolic hydroxyl position, except possibly in an exceptional instance, where a stable methylol group has been formed by virtue of resin manufacture, in presence of an alkaline catalyst. Such occurrence of a stable methylol radical is the exception, rather than the rule, and in any event, apparently does not occur when the resin is manufactured in the presence of an acid catalyst.

(5) The total number of alkyleneoxy radicals introduced must be at least equal to twice the phenolic nuclei.

(6) The number of alkyleneoxy radicals introduced not only must meet the minimum of item (5) above, but must be sufficient to endow the product with sufficient hydrophile property to have emulsifying properties, or be self-emulsifiable, or self-dispersible, or the equivalent, as hereinafter described. The invention is concerned particularly with the use, as a reactant, of sub-surface-active and surface-active compounds.

(7) The use of a product derived from cashew nutshell liquid, with or without hydrogenation, so that all or a significant proportion of the phenolic nuclei contain a meta substituted hydrocarbon side chain having 15 carbon atoms.

We have found that the remarkable properties of the parent materials as demulsifiers persist in derivatives which bear a simple genetic relationship to the parent material, and in fact, to the ultimate resin polymer, for instance, in the products obtained by reaction of the oxyalkylated compounds with low molal monocarboxy acids, high molal monocarboxy acids, polycarboxy acids or their anhydrides, alpha-chloro monocarboxy acids, epichlorohydrin, etc. The derivatives also preferably must be obtained from oxyalkylated products, showing at least the necessary hydrophile properties per se.

More specifically then, the new compounds herein described and particularly for use as demulsifying agents, are obtained from cashew nutshell liquid, anacardol (3-penta-decadienylphenol), cardanol (dihydroanacardol or 3-pentadecenylphenol), and hydrogenated cardanol (dihydrocardanol or tetrahydroanacardol or 3-pentadecylphenol). Commercially, these products appear on the market in one of three forms—cardanol, cashew nutshell liquid, and hydrogenated cardanol.

The new compounds or compositions herein described are prepared from the phenolic compositions present in or derived from the oils extracted from the Anacardium genus of the Anacardiaceae family. Cashew nutshell liquid is described as consisting of about 90% anacardic acid $C_{22}H_{32}O_3$ and about 10% of cardol, $C_{32}H_{52}O_4$, with very small fractional percentages of other materials. The generally accepted formula of anacardic acid is

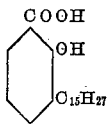

Pyrolytic distillation causes conversion into phenols.

Another derivative of cashew nutshell liquid in addition to the hydrogenated derivative, is the chlorinated anacardol and chlorinated cardanol. For practical purposes, the principal constituent of chlorinated cashew nutshell liquid is chlorinated cardanol. Chlorination refers to side chain chlorination only, and not to nuclear chlorination. The actual purpose of chlorination is well known and involves the addition of approximately 25% of chlorine, by weight, so as to stretch any ethylene linkage. See U. S. Patent No. 2,399,735, dated May 7, 1946, to Harvey.

These reactive phenolic compounds are combined with suitable aldehydes, including formaldehyde and its isomers, acetaldehyde and higher aldehydes, such as butyraldeyde, heptaldehyde, cyclic aldehydes, such as benzaldehyde, furfural, etc. Resins can be prepared in which part of the treated cashew nutshell liquid or its derivatives, is replaced by another trifunctional phenol, such as ordinary phenol (hydroxybenzene), meta-cresol, or similar derivatives, in which the ethyl or propyl group appears in the meta position. Furthermore, these compounds, which may also be called anacardic acid phenols, may be combined with difunctional phenol, such as ortho-cresol, para-cresol, para-ethylphenol, para-propylphenol, para-butylphenol, para-amylphenol, para-hexylphenol, para-isooctylphenol, ortho-phenolphenol, ortho-benzylphenol, para-benzyl-phenol, para-cyclohexylphenol, phenol-phenyl-olmethylmethane, etc. The effectiveness of the chemical compounds herein contemplated for numerous purposes, appears to be largely directly related to the long carbon atom chain of the anacardic acid phenol. As a result, it is only necessary to have one anacardic acid phenol in a polymer interrupted by phenols having other structures. For instance, we have prepared excellent products, in which one mole of cardanol or its equivalent, such as hydrogenated cardanol, has been combined with 2, 3 or 4 moles of ortho-cresol, tertiary amylphenol, tertiary butylphenol, etc. Similarly, excellent compounds have been prepared, in which 5% to 25% of cardanol has been replaced by ordinary phenol or metacresol, particularly if acetaldehyde or higher aldehydes are employed. Similarly, compounds have been prepared involving, for example, ¾ mole or slightly more of cardanol, one-fourth mole or slightly less of phenol, or metacresol, and ⅔ mole of a difunctional phenol, such as orthocresol, para-cresol, para-butylphenol, para-amylphenol, etc.

Any aldehyde capable of forming a methylol or a substituted methylol group and having not more than 8 carbon atoms is satisfactory, so long as it does not possess some other functional group or structure which will conflict with the resinification reaction, or with the subsequent oxyalkylation of the resin, but the use of formaldehyde, in its cheapest form of an aqueous solution, for the production of the resins, is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde, on one hand, and a comparable product prepared from the same phenolic reactant and heptaldehyde on the other hand. The former, as shown in certain subsequent examples, is a hard, brittle, solid, whereas, the latter is soft and tacky, obviously easier to handle in the subsequent oxyalkylation procedure.

Cyclic aldehydes may be employed, particularly benzaldehyde. The employment of furfural requires careful control, for the reason that in addition to its aldehydic function, furfural can form vinyl condensations, by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethyl-butyraldehyde, heptaldehyde, and benzaldehyde, furfural and glyoxal. It would appear that the use of glyoxal should be avoided, due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes, although usually this has no advantage.

Resins of the kind which are used as intermediates for the compounds used in the practice of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts, they enter into the condensation reaction, and, in fact, may operate by initial combination with the aldehydic reactant. The compound hexamethylenetetramine illustrates such a combination. In light of these various reactions, it becomes difficult to present any formula which would depict the structure of the various resins prior to oxyalkylation. More will be said subsequently as to the difference between the use of alkaline catalyst and an acid catalyst; even in the use of an alkaline catalyst, there is considerable evidence to indicate that the products are not identical where different basic materials are employed. The basic materials employed include not only those previously enumerated, but also the hydroxides of the alkali metals, hydroxides of the alkaline earth metals, salts of strong bases and weak acids, such as sodium acetate, etc.

As has been pointed out previously, some of the resins herein described and used as raw materials are obtained by the use of certain other phenols in combination with the cashew nutshell liquid phenol. Difunctional phenols having only one carbon atom in the substituent group are limited to ortho and para-cresol. Those having 2 to 3 carbon atoms are limited to ortho and para-ethylcresol, and ortho and para-propylphenol. Particularly suitable among the difunctional phenols are those having 4 to 8 carbon atoms in the substituent radical. This particular subdivision of difunctional phenols include para-tertiary butylphenol; para-secondary butylphenol; para-tertiary amylphenol; para-secondary amylphenol; para-tertiary hexylphenol; para-isooctylphenol, ortho-phenylphenol; para-phenylphenol; ortho-benzylphenol; para-benzylphenol; and para-cyclohexylphenol, and the corresponding ortho-para substituted metacresols and 3,5-xylenols.

Similarly, difunctional phenols having 9 or more carbon atoms in the substituent radical and as many as 24 carbon atoms include the following: Para-nonylphenol; para-decylphenol; para-dodecylphenol; para-tetradecylphenol; para-octadecylphenol; para-menthylphenol; para-eicosylphenol; para-doeicosylphenol; and para-tetraeicosylphenol. The comparable ortho derivatives or mixtures of the ortho derivatives and para derivatives may be employed. Trifunctional phenols having no side chains or short side chains are limited to phenol (hydroxy benzene) and metacresol. As far as the difunctional phenols are concerned and to the extent that they are derivatives of hydroxy benzene, it is to be noted that the analogous ortho-para substituted metacresols and 3,5-xylenols may also be employed, insofar that they are still difunctional phenols and the methyl group or groups in the meta position are without substantial effect on the property of the resin. Trifunctional phenols exclude any having 4 carbon atoms or more in the meta position substituent.

It has been previously pointed out that the resins employed as raw materials in the manufacture of the herein described compounds are obtained from anacardic acid phenols alone, or in combination with difunctional phenols or trifunctional phenols, or both. No description of trifunctional phenols is needed, and as to difunctional phenols, reference is made to the language used in our aforementioned co-pending applications Serial Nos. 8,722 and 8,723, both filed February 16, 1948. As to anacardic acid phenols, as herein described, one may conveniently employ the formula:

in which R represents a hydrocarbon radical or a chlorinated hydrocarbon radical, as exemplified by cashew nutshell liquid phenol, or its hydrogenated or chlorinated derivative.

The manufacture of organic solvent-soluble thermoplastic phenol-aldehyde resins is concerned largely with the manufacture of (a) resoles or Novolaks from trifunctional phenols; (b) manufacture of varnish resins from difunctional phenols; and (c) the manufacture of the cardanol type resin from phenols or phenolic mixtures, as previously specified. There is an ample description in the literature as to the manufacture of resins from cardanol type phenols alone and in combination with other phenols. Any suitable process may be employed to make the herein described resins which are used as raw materials. We have found it most convenient to use the same general procedures which are applicable to the manufacture of resins from difunctional phenols, particularly in which the substituent radical has 4 to 8 carbon atoms. This procedure is described, for example, in the literature, and specific examples included in our aforementioned copending application Serial No. 8,731, filed February 16, 1948.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins, in that phenol, being water-soluble, reacts readily with an aqueous aldehyde solution without further difficulty, while when a water-insoluble phenol is employed, some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt, plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous, as hereinafter described in detail. Another variation of procedure is to employ such organic sulfo-acids, in the form of their salts, in connection with an alkali-catalyzed resinification procedure. Detailed examples are included subsequently.

Sometimes conventional resinfication procedure is employed, using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

In the hereto appended claims there is specified, among other things, the resin polymer containing at least 3 phenolic nuclei. Such minimum molecular size is most conveniently determined, as a rule, by cryoscopic method, using benzene, or some other suitable solvent, for instance, one of those mentioned elsewhere herein as a solvent for such resins. As a matter of fact, using the procedures herein described or any conventional resinification procedure, will yield products usually having definitely in excess of three nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921)). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co. 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of formaldehyde, particularly where the substituent has 4 or 5 carbon atoms. Where the number of carbon atoms in a substituent approximates the upper limit specified herein, for instance 7 or 8, there may be some tendency to dimerization. The usual procedure to obtain a dimer involves an enormously large excess of the phenol, for instance, 8 to 10 moles per mole of aldehyde. Substituted dihydroxydiphenylmethanes obtained from substituted phenols are not resins as that term is used herein.

Although any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfo-acid and a mineral acid as a catalyst, and xylene as a solvent. By way of illustration, certain subsequent examples are included, but it is to be understood the herein described invention is not concerned with the resins per se or with any particular method of manufacture but is concerned with the use of derivatives obtained by the subsequent oxyalkylation thereof. The phenol-aldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used, it is advantageously added at the beginning of the resinification procedure, or before the reaction has proceeded very far.

The solvent can be removed afterwards by distillation with or without the use of vacuum, and a final higher temperature can be employed to complete reaction, if desired. In many instances, it is most desirable to permit part of the solvent, particularly when it is inexpensive, e. g., xylene, to remain behind in a predetermined amount, so as to have a resin which can be handled more conveniently in the oxyalkylation stage. If a more expensive solvent, such as decalin, is employed, xylene or other inexpensive solvent may be added after the removal of decalin, if desired.

Reference has been made to the word "fusible." Ordinarily a thermoplastic resin is identified as one which can be heated repeatedly and still not lose its thermoplasticity. It is recognized, however, that one may have a resin which is initially thermoplastic, but on repeated heating, may become insoluble in an organic solvent, or at least no longer thermoplastic, due to the fact that certain changes take place very slowly. As far as the present invention is concerned, it is obvious that a resin, to be suitable, need only be sufficiently fusible to permit processing to produce our oxyalkylated products and not yield insolubles or cause insolubilization or gel formation, or rubberiness, as previously described. Thus, resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

Previous reference has been made to organic solvent-soluble resins, such as Novolaks or resoles of the kind obtained exclusively from difunctional phenols. The present invention involves at least three types of resins which have been specified in detail. All these may be considered as members of the broad generic class of organic solvent-soluble fusible phenol-aldehyde resins contemplated in our two aforementioned co-pending applications Serial Nos. 8,722 and 8,723. In all such instances, the resin consists of discrete or separate molecules, as differentiated from a completely cross-linked resin. Fusibility and solubility in an organic solvent are characteristic of this state of sub-division.

The following examples, 1ª through and including 15ª, are derived from cashew nutshell liquid phenols, or their derivatives alone; Examples 16ª through 33ª, inclusive, are concerned with examples where a trifunctional phenol free from a long chain meta substituent is used in combination; Examples 34ª through 59ª, inclusive, are concerned with examples where a difunctional phenol is used in connection with the same type of compound; and 60ª through 82ª are concerned with compounds where all three types of phenolic compounds are employed:

EXAMPLE 1ª

|  | Grams |
| --- | --- |
| Cardanol (vacuum distilled) | 403.2 |
| Formaldehyde (37%) | 113.4 |
| Xylene | 403.2 |
| Concentrated HCl | 3.3 |
| Monoalkyl ($C_{10}$–$C_{20}$, principally $C_{12}$–$C_{14}$) benzene monosulfonic acid sodium salt | 1.4 |

(Examples of alkylaryl sulfonic acids which serve as catalysts and as emulsifiers particularly in the form of sodium salts include the following:

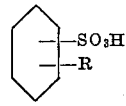

R is an alkyl hydrocarbon radical having 12–14 carbon atoms.

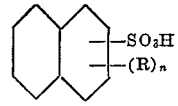

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and interchangeable the following specific sulfonic acids or their sodium salts: A mixture of di- and tri-propylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: one for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending upon the position of the three-way glass stop-cock. This pemitted convenient withdrawal or water from the water trap. The equipment, furthermore, pemitted any setting of the valve without disconnecting the equipment. The resin pot was heated with a glass fiber electrical heater constructed to fit snugly around the resin pot. Such heaters, with regulators, are readily available.

The phenol-formaldehyde acid catalyst (acid and sulfonate salt in combination) and solvent were combined in the resin pot described. This particular resin was a reddish-black liquid, having a viscosity comparable to that of ordinary oil or slightly in excess thereof. Heat was applied with gentle stirring and the temperature was raised to 80°–85° C., at which point a mild exothermic reaction took place. This reaction raised the temperature to approximately 105°–110° C. The reaction mixture was then permitted to reflux at 100°–105° C. for approximately three and a half hours. The reflux trap arrangement was then changed from the reflux position to the normal water entrapment position. The water of solution and the water of reaction were permitted to distil out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The xylene-free resin obtained was reddish-black in color, and soft to pliable in consistency.

EXAMPLE 2a

| | Grams |
|---|---|
| Cardanol (vacuum distilled) | 576 |
| Formaldehyde (37%) | 160 |
| Ammonia (26° Baumé or about 28%) | 18.3 |
| Xylene | 575 |

All these items were mixed together and refluxed for 6 hours, followed by removal of water by distillation and heating to 125° C. for approximately 4 hours, forming a pliable or semi-solid resin. The reactants were, of course, stirred during the reflux period. The resin so obtained is thermoplastic and soluble in xylene.

EXAMPLE 3a

| | Grams |
|---|---|
| Cardanol (vacuum distilled) | 447.0 |
| Concentrated sulfuric acid | 5.0 |
| Acetaldehyde | 78.0 |
| Xylene | 200.0 |

The phenol, acid catalyst, and 50 grams of xylene were combined in the resin pot previously described under Example 1a. The initial mixture did not include the aldehyde. The mixture was heated with stirring to approximately 150° C. and permitted to reflux.

The remainder of the xylene—150 grams—was then mixed with the acetaldehyde, and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed, the remainder of the procedure was essentially the same as in Example 1a. The solvent-free resin was reddish-black in color and comparatively soft. In subsequent experiments where this procedure is followed or the modifications in the next example (Example 4a), the amount of xylene may be increased as the occasion requires. Under such circumstances, 50 grams of xylene are used in the initial step and the residual xylene, which may be more than 150 grams, is added in the second stage.

EXAMPLE 4a

| | Grams |
|---|---|
| Cardanol (vacuum distilled) | 288 |
| n-Butyraldehyde | 72 |
| Concentrated sulfuric acid | 3 |
| Xylene | 200 |

The procedure employed was essentially the same as in Example 3a, where acetaldehyde was employed, but with the difference that, due to the fact that the particular aldehyde was a higher boiling aldehyde, it was not necessary to dilute it with xylene, although this procedure may be employed, if desired. For this reason, we added all the xylene to the initial mixture and the higher boiling aldehyde was added by means of the separatory funnel arrangement; thus, the phenol, acid catalyst and solvent combined in the resin pot by the same procedure used as in Example 3a. The solvent-free resin was soft and dark red in appearance. See what is said under the preceding heading in regard to subsequent examples, if more than 200 grams of xylene are employed.

EXAMPLE 5a

| | Grams |
|---|---|
| Cardanol (vacuum distilled) | 2880 |
| Heptaldehyde | 1140 |
| Concentrated sulfuric acid | 30 |
| Xylene | 2000 |

The procedure followed was the same as that of Example 4a. The appearance of the solvent-free resin was the same as that in the immediately preceding example.

EXAMPLE 6a

| | Grams |
|---|---|
| Hydrogenated cardanol | 2880 |
| Formaldehyde (37%) | 800 |
| Concentrated HCl | 10 |
| Monoalkyl ($C_{10}$–$C_{20}$, principally $C_{12}$–$C_{14}$) benzene monosulfonic acid sodium salt | 10 |
| Xylene | 2000 |

The phenol employed was the product offered for sale in the open market. It was a brown mealy solid, suggestive in appearance of off-color brown sugar. Hydrogenated cardanol is hydrogenated in the side chain only. The apparatus employed was that described in Example 1a, preceding.

All of the above ingredients, except the xylene, were mixed, and, with strong agitation, are heated slowly to approximately 65° C. when a spontaneous or vigorous reaction takes place so as to raise the temperature rather rapidly to 95° C., accompanied by some foaming. At this point the 2000 grams of xylene are added to thin out the reaction mixture and permit satisfactory agitation. The mixture is allowed to distil under a reflux condenser with the temperature determined by boiling point of water, approximately 100° C. Operating temperature is usually within the range of 105° to 110° C. After the completion of a 2-hour reflux distillation at this temperature, or at least sufficient to eliminate any odor of formaldehyde, removal of the water is started, using the usual trap arrangement. Approximately 685 grams of water are distilled off. The product, minus the solvent, is a semi-solid, tacky resin of a heavy tar-like consistency. It is decidedly more viscous than similar resins made from cardanol which has not been subjected to hydrogenation.

EXAMPLE 7a

The same procedure was followed as in Example 3a, except that the cardanol was replaced, mole for mole, with hydrogenated cardanol. The resin obtained is somewhat softer and more fluid in character than the comparable resin obtained from formaldehyde.

EXAMPLE 8a

The same procedure was followed as in Example 4a, except that the acetaldehyde was replaced, mole for mole, with n-butyraldehyde. The resin obtained was somewhat softer and more fluid in character than the comparable resin obtained from formaldehyde.

EXAMPLE 9a

The same procedure was followed as in Example 4a, except that the acetaldehyde was replaced, mole for mole, with heptaldehyde. The resin obtained was somewhat softer and more fluid in character than the comparable resin obtained from formaldehyde.

Previous reference has been made to chlorinated cardanol. Laboratory batches can be prepared conveniently, following the procedure which we use and which is as follows: 1500 grams of vacuum distilled cardanol are chlorinated with stirring for 10 hours between 15° and 60° C. The amount of chlorine absorbed is about 23% of the cardanol. The chlorinated substance is a thick, viscous black tar.

EXAMPLE 10a

| | Grams |
|---|---|
| Chlorinated cardanol | 342 |
| Butyraldehyde | 72 |
| Concentrated sulfuric acid | 4 |
| Xylene | 350 |

The same procedure was followed as in Example 4a, preceding. The reflux time was 1½ hours. The resin, minus solvents, was black and semi-soft in appearance. The solution as prepared contained 46.8% xylene.

EXAMPLE 11a

| | Grams |
|---|---|
| Hydrogenated cardanol | 288 |
| Propionic aldehyde (96%) | 61 |
| Concentrated sulfuric acid | 4.5 |
| Xylene | 250 |

The same procedure was employed as in Example 4a, preceding. The solvent-free resin was reddish black in color and soft to semi-fluid in consistency. The xylene solution as prepared contained 43.2% xylene.

EXAMPLE 12a

| | Grams |
|---|---|
| Cardanol (vacuum distilled) | 432 |
| Benzaldehyde | 159 |
| Concentrated sulfuric acid | 6 |
| Xylene | 300 |

The procedure followed was the same as described in Example 4a, preceding. The appearance of the resin was somewhat suggestive of rubberiness and it was not entirely homogeneous. It was dark reddish-brown in color.

EXAMPLE 13a

| | Grams |
|---|---|
| Cardanol (vacuum distilled) | 576 |
| Furfural | 192 |
| Potassium carbonate | 12 |

The furfural was shaken with dry sodium carbonate prior to use, to eliminate any acids, etc. The procedure employed was substantially that described in detail in Technical Bulletin, No. 109, of the Quaker Oats Co., Chicago, Ill. The above reactants were heated under the reflux condenser for 2 hours in the same resin pot arrangement described in Example 1a. The separatory funnel device was not employed. No xylene or other solvent was added at this stage. The amount of material vaporized and condensed was comparatively small, except for the water of reaction. At the end of this heating or reflux period the trap was set to remove the water. The maximum temperature during and after removal of water was approximately 202° C. The material in the trap represented 32 cc. water and 2.5 cc. furfural. At this point 250 grams of xylene were added so as to give a suitable solution. The resin was reddish-black in color, xylene-soluble and semi-soft or tacky in consistency. The solution as prepared contained approximately 25% xylene.

EXAMPLE 14a

A resin was prepared in the exact manner described under Example 5a. The resin so obtained was subjected to vacuum distillation in the following manner: The xylene solution was heated to 200° C. under vacuum (25 mm. Hg). This vacuum distillation removed all the solvent and resulted in a reddish-black resin which was somewhat more viscous than the same resin obtained by evaporation of the xylene on a steam bath overnight. The appearance of the resin so obtained was reddish-black in color, and it was, of course, xylene-soluble.

EXAMPLE 15a

| | Grams |
|---|---|
| Cardanol (vacuum distilled) | 576 |
| Formaldehyde (37%) | 178 |
| Xylene | 300 |
| Catalyst | None |

The above ingredients were placed in an autoclave with a stirrer and heated to approximately 160° C., and stirred for 4½ hours. The pressure during this time varied from 105 to 125 pounds per square inch gauge pressure. The resultant product was a thick reddish material, having somewhat gummy or rubbery characteristics. To this were added 1000 grams of xylene and heated for an hour at 160° C. under pressure of 100 pounds per square inch so as to give a complete solution. This solution was then treated in the following manner: The solution was diluted further by the addition of 2100 grams of xylene. This dilute xylene solution was divided into three parts, and each third handled separately. The procedure was simply to wash approximately three times with an equal volume of water and then remove the xylene under 15 mm. (Hg) pressure until the xylene was 63%. This solution was a brown viscous syrup, which was subsequently subjected to oxyalkylation. The resin, when separated from the solvent was a reddish-amber semi-rubbery material.

EXAMPLE 16a

| | Grams |
|---|---|
| Cardanol (vacuum distilled) | 245 |
| Phenol | 14.1 |
| Formaldehyde (37%) | 80 |
| Concentrated HCl | 1 |
| Monoalkyl ($C_{10}$–$C_{20}$, principally $C_{12}$–$C_{14}$) benzene monosulfonic acid sodium salt | 1 |

Thea pparatus used was the same equipment, as described under the heading of Example 1ª. The above materials were mixed and heated with agitation for about 2 hours at 100° C. or until there was no further odor of unreacted formaldehyde. After this, water was allowed to distill off until the product began to thicken and then 200 grams of xylene were added so as to thin it. The mass was then allowed to reflux with the conventional trap which separated the water and returned the condensed xylene. During the final stage, the temperature remained at approximately 140°–150° C. The xylene was then removed under vacuum, using a temperature of 160° C. The final product was a semi-solid, tar-like resin, which was xylene-soluble.

EXAMPLE 17ª

| | Grams |
|---|---|
| Cardanol (vacuum distilled) | 550 |
| Phenol | 26 |
| Formaldehyde (37%) | 160 |
| Ammonia (26° Baumé or about 28%) | 18.3 |

All items were mixed together and refluxed for 6 hours, followed by removal of water by distillation, heated to 125° C. and held at this temperature for approximately 4 hours, forming a semi-solid or pliable resin. The resin so obtained was thermoplastic and soluble in xylene.

EXAMPLE 18ª

| | Grams |
|---|---|
| Cardanol (vacuum distilled) | 202 |
| Phenol | 28.2 |
| Concentrated sulfuric acid | 3 |
| Acetaldehyde | 44 |
| Xylene | 350 |

The procedure followed was the same as that described in Example 3ª, except that 350 grams of xylene were employed instead of 200 grams, and the residual addition of xylene was 300 grams instead of 150 grams. The resulting resin was semi-pliable to rubbery, and reddish-brown in color.

EXAMPLE 19ª

The same procedure was followed as in the preceding example, that is, Example 18ª, except that the amounts of cardanol and phenol employed were 347 grams and 100 grams, respectively. The solvent-free resin was soft and dark red in appearance.

EXAMPLE 20ª

The same procedure was followed as in Example 18ª, except that the amounts of cardanol and phenol employed were 300 grams and 147 grams, respectively. The resin obtained was soft.

EXAMPLE 21ª

| | Grams |
|---|---|
| Cardanol (vacuum distilled) | 250 |
| Phenol | 38 |
| n-Butyraldehyde | 72 |
| Concentrated sulfuric acid | 3 |
| Xylene | 200 |

The procedure employed was that of Example 4ª. The resin was soft.

EXAMPLE 22ª

| | Grams |
|---|---|
| Cardanol (vacuum distilled) | 200 |
| Phenol | 88 |
| n-Butyraldehyde | 72 |
| Concentrated sulfuric acid | 3 |
| Xylene | 200 |

The procedure employed was that of Example 4ª. The resin was soft.

EXAMPLE 23ª

| | Grams |
|---|---|
| Cardanol (vacuum distilled) | 490 |
| Metacresol | 32.4 |
| Heptaldehyde | 228 |
| Concentrated sulfuric acid | 8 |
| Xylene | 350 |

The procedure employed was that of Example 4ª. The resin was soft.

EXAMPLE 24ª

| | Grams |
|---|---|
| Cardanol (vacuum distilled) | 200 |
| Phenol | 88 |
| Heptaldehyde | 114 |
| Concentrated sulfuric acid | 3 |
| Xylene | 200 |

The procedure employed is that of Example 4ª. The resin is soft.

EXAMPLE 25ª

| | Grams |
|---|---|
| Hydrogenated Cardanol | 270 |
| Phenol | 18 |
| Formaldehyde (37%) | 80 |
| Concentrated HCl | 1 |
| Monoalkyl ($C_{10}$–$C_{20}$, principally $C_{12}$–$C_{14}$) benzene monosulfonic acid sodium salt | 1 |
| Xylene | 200 |

The procedure followed was that of Example 6ª. The product minus the solvent was a semi-solid, tacky resin of a heavy tar-like consistency. It was decidedly more viscous than similar resins made from cardanol, which has not been subjected to hydrogenation.

EXAMPLE 26ª

The same procedure was followed as in Examples 16ª to 25ª, except that phenol was replaced by the molar equivalent of metacresol. The products were similar to those obtained with the use of phenol.

EXAMPLE 27ª

The same procedure was followed as in Examples 16ª to 25ª, except that phenol is replaced by the molar equivalent of metaethylphenol or metapropylphenol. Similar products were obtained.

EXAMPLE 28ª

| | Grams |
|---|---|
| Cardanol (hydrogenated) | 288 |
| Metacresol | 19 |
| Formaldehyde (37%) | 95 |
| Concentrated HCl | 4.5 |
| Monoalkyl ($C_{10}$–$C_{20}$, principally $C_{12}$–$C_{14}$) benzene monosulfonic acid sodium salt | 1.5 |
| Xylene | 300 |

The procedure followed was the same as in Example 1ª, preceding. The resin minus solvents was reddish-black in color, and semi-pliable to hard in consistency. The solution as prepared contained 48.7% xylene.

EXAMPLE 29ª

| | Grams |
|---|---|
| Chlorinated cardanol | 158 |
| Metacresol | 8.10 |
| Butyraldehyde | 36.00 |
| Concentrated sulfuric acid | 2.0 |
| Xylene | 150 |

The procedure employed was the same as described in Example 4a, preceding. The solvent-free resin was black and soft to semi-fluid in consistency. The solution as prepared contained 43.6% xylene.

EXAMPLE 30a

| | Grams |
|---|---|
| Cardanol (vacuum distilled) | 490 |
| Metacresol | 32.4 |
| Heptaldehyde | 114 |
| Benzaldehyde | 138 |
| Diamylphenol | 70.2 |
| Concentrated sulfuric acid | 8 |
| Xylene | 350 |

The procedure followed was the same as described in Example 4a, preceding. The solvent-free resin was reddish-black in color, xylene-soluble and semi-soft to pliable in consistency.

EXAMPLE 31a

| | Grams |
|---|---|
| Cardanol (vacuum distilled) | 490 |
| Metacresol | 32.4 |
| Furfural | 192 |
| Potassium carbonate | 12 |

The procedure followed was identically the same as in Example 13a, preceding, with the addition of 250 grams of xylene. The solvent-free resin was reddish-black in color, xylene-soluble, semi-hard or pliable in consistency, with some tackiness. The solution, as prepared, contained 27% xylene.

EXAMPLE 32a

A resin was prepared in the same manner as described under Example 23a. The resin so obtained was subjected to vacuum distillation in the following manner: The xylene was removed by subjecting the solution to heat and vacuum, using a temperature up to 200° C. and a vacuum of 25 mm. Hg. As a result of such treatment, the xylene was removed completely and the resin so obtained was more viscous than the one which had not been heated and where xylene had been removed by evaporation on a steam bath overnight. The appearance of the resin was not changed materially as it was still reddish-black in color and was still xylene-soluble.

EXAMPLE 33a

| | Grams |
|---|---|
| Cardanol (vacuum distilled) | 518 |
| Metacresol | 21.6 |
| Diamylphenol | 70.2 |
| Formaldehyde (37%) | 203 |
| Catalyst | None |
| Xylene | 450 |

The above mixture was placed in an autoclave and heated for 4¾ hours at 150° to 172° C. During this time the gauge pressure varied from 120 lbs. per square inch to 170 pounds per square inch. The resultant product was a somewhat viscous, reddish mixture. To this there was added 875 grams of xylene and heated for one hour at 158–165° C. under a pressure of 100 pounds per square inch, so as to give a completely homogeneous solution. This solution was treated in the following manner: It was diluted further with the addition of 2000 grams of xylene. This dilute xylene solution was divided into three parts and each third handled separately. The procedure was simply to wash approximately three times with an equal volume of water and remove the xylene under 25 mm. Hg. pressure until the xylene represented about 43% of the solution. This was a viscous, reddish-black mixture, which was subsequently subjected to oxyalkylation. The resin, when separated from the solvent, was reddish-black in color and semi-pliable to tacky in consistency.

EXAMPLE 34a

| | Grams |
|---|---|
| Cardanol (vacuum distilled) | 576 |
| Paracresol | 108 |
| Formaldehyde (37%) | 240 |
| Concentrated HCl | 4.5 |
| Xylene | 250 |
| Monoalkyl ($C_{10}$–$C_{20}$, principally $C_{12}$–$C_{14}$) benzene monosulfonic acid sodium salt | 3 |

The equipment used was the same as described in Example 1a. The procedure followed was that of Example 16a, except that during the final stage, the temperature remained at approximately 130° C. The xylene was then removed under vacuum (approximately 25 mm. Hg), using a temperature of 160° C. The final product was a soft, pliable resin which was xylene-soluble.

EXAMPLE 35a

| | Grams |
|---|---|
| Cardanol | 576 |
| Paracresol | 108 |
| Formaldehyde (37%) | 240 |
| Ammonia (26° Baumé) | 27.5 |

All of the above materials were refluxed together for 6 hours, followed by removal of water by distillation, heated to 125° C. and held at this temperature for approximately 4 hours until a hard, brittle resin was obtained. The resin so obtained was thermoplastic and soluble in xylene.

EXAMPLE 36a

| | Grams |
|---|---|
| Cardanol | 357.6 |
| Ortho or para-cresol | 89.4 |
| Concentrated sulfuric acid | 5.0 |
| Acetaldehyde | 78 |
| Xylene | 200 |

The procedure followed was the same as that described in Example 3a, preceding. The solvent-free resin obtained was soft, almost fluid, and xylene-soluble.

EXAMPLE 37a

The same procedure was followed as in Example 36a, except that the amount of cardanol employed was reduced to 268.2 grams and the amount of cresol was increased to 178.8 grams.

EXAMPLE 38a

The same procedure was followed as in Example 36a, except that the amount of cardanol employed was reduced to 137.3 grams and the amount of cresol increased to 268 grams.

EXAMPLE 39a

The same procedure was followed as in Example 36a, except that para-ethylphenol, para-propylphenol, para-butylphenol, para-amylphenol, or para-octylphenol was substituted in molar equivalent amounts for the ortho or para-cresol.

EXAMPLE 40a

The same procedure was followed as in the preceding six examples, except that 78 grams of acetaldehyde were replaced by a molar equivalent of normal butyraldehyde.

EXAMPLE 41ª

The same procedure was followed as in Examples 36ª to 38ª, except that the 78 grams of acetaldehyde were replaced by a molar equivalent of heptaldehyde.

EXAMPLE 42ª

| | Grams |
|---|---|
| Cardanol (vacuum distilled) | 115.2 |
| Para-ethylphenol | 12.2 |
| Formaldehyde (37%) | 40 |
| Concentrated HCl | .8 |
| Monoalkyl ($C_{10}$–$C_{20}$, principally $C_{12}$–$C_{14}$) benzene monosulfonic acid sodium salt | .5 |
| Xylene | 75 |

The molar ratio was 4 of cardanol to 1 of para-ethylphenol. The procedure followed was the same as that in Example 1ª.

EXAMPLE 43ª

The same procedure was followed as in the preceding example, except that the para-ethylphenol was replaced by the molar equivalent amount of ortho-cresol, para-butylphenol, para-octylphenol, para-amylphenol, para-phenylphenol, or other difunctional phenol. In the corresponding example referred to in the subsequent table giving oxyethylation procedure, the specific phenol employed was para-secondary butylphenol.

EXAMPLE 44ª

The same procedure was followed as in Example 42ª and Example 43ª, except that the molar ratio of cardanol to difunctional phenol was changed from 4 to 1 to 3 to 2 with the molar proportion of total phenol the same. Otherwise, the same reactants and the same procedures were employed. In the corresponding example referred to in the subsequent table giving oxyethylation procedure, the specific phenol employed was para-secondary butylphenol.

EXAMPLE 45ª

Examples 34ª to 44ª were repeated, replacing cardanol by hydrogenated cardanol. Since the commercial products are not one hundred percent pure, it was not necessary to make any change in the formulations, because of the slight difference in molecular weight between hydrogenated cardanol and cardanol. However, allowance for this slight difference can be made.

EXAMPLE 46ª

| | Grams |
|---|---|
| Chlorinated cardanol | 171 |
| Para-tertiary amylphenol | 82 |
| Butyraldehyde | 72 |
| Concentrated sulfuric acid | 2.5 |
| Xylene | 250 |

The procedure followed was the same as described under the heading of Example 4ª, preceding. The solvent-free resin was black and soft to semi-fluid in consistency. The solution as prepared contained 44.8% xylene.

EXAMPLE 47ª

| | Grams |
|---|---|
| Cardanol (vacuum distilled) | 288 |
| Nonylphenol | 220 |
| Butyraldehyde | 144 |
| Concentrated sulfuric acid | 5 |
| Xylene | 250 |

The procedure followed was the same as described under the heading of Example 4ª, preceding. The solvent-free resin was reddish-black in color and soft to semi-fluid in consistency. The solution, as prepared, contained 29.4% xylene.

EXAMPLE 48ª

| | Grams |
|---|---|
| Cardanol (vacuum distilled) | 288 |
| Menthylphenol | 232 |
| Heptaldehyde | 228 |
| Concentrated sulfuric acid | 8 |
| Xylene | 350 |

The procedure followed was the same as described under the heading of Example 4ª, preceding. The solvent-free resin was reddish-black in color and soft to semi-fluid in consistency.

EXAMPLE 49ª

| | Grams |
|---|---|
| Cardanol (vacuum distilled) | 288 |
| Para-decylphenol | 232 |
| Butyraldehyde | 144 |
| Concentrated sulfuric acid | 5 |
| Xylene | 250 |

The procedure followed was the same as described under the heading of Example 4ª, preceding. The resultant solvent-free resin was semi-fluid and dark red in appearance.

EXAMPLE 50ª

| | Grams |
|---|---|
| Cardanol (vacuum distilled) | 288 |
| Nonylphenol | 220 |
| Benzaldehyde | 212 |
| Concentrated sulfuric acid | 4 |
| Xylene | 300 |

The procedure followed was the same as described under Example 4ª, preceding. The resultant resin was dark red in color, and viscous in consistency.

EXAMPLE 51ª

| | Grams |
|---|---|
| Cardanol (vacuum distilled) | 288 |
| Nonylphenol | 220 |
| Furfural | 192 |
| Potassium carbonate | 12 |

The procedure followed was the same as in Example 13ª, preceding, including the addition of 250 grams of xylene. The solvent-free resin was reddish-black in color, xylene-soluble, and semi-soft or tacky in consistency. The solution as prepared contained 27.4% xylene.

EXAMPLE 52ª

| | Grams |
|---|---|
| Cardanol (vacuum distilled) | 288 |
| Nonylphenol | 220 |
| Formaldehyde (37%) | 176 |
| Water | 34 |
| Xylene | 226 |
| Sodium hydroxide | 7.9 |

The above reactants were combined in a resin pot similar to that previously described, equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. of water. On standing, a separation was effected, and the aqueous lower layer drawn off. The upper resinous solution was then washed with 300 ml. of water to remove any excess HCHO, sodium acetate, or acetic acid. The xylene solution was heated under a condenser at 150° C. for 30 minutes. Since subsequent experimentation showed that removal of this xylene at this particular temperature employing vacuum tended to cause the product to become rubbery, the procedure employed was to permit the xylene to remain and add enough additional xylene so the final resin solution represented 50%, by weight, of resin. The amount of xylene required was 300 grams.

EXAMPLE 53ª

| | Grams |
|---|---|
| Cardanol (vacuum distilled) | 288 |
| Nonylphenol | 220 |
| Formaldehyde (37%) | 178 |
| Xylene | 300 |
| No catalyst | None |

The same procedure was followed as in Example 15ª, preceding. Reaction was conducted in a stirring autoclave for 4½ hours at a temperature of 160° C. and 145 pounds gauge pressure. When resinification was complete, 100 grams of xylene were added and stirred, using the same temperature and pressure for approximately one hour to obtain complete solution or suspension. The resin was dispersible in xylene but not clearly soluble. It was clearly soluble, however, in diethylene glycol diethylether. The solvent-free resin was reddish-amber in color and semi-pliable to rubbery in consistency.

EXAMPLE 54ª

| | Grams |
|---|---|
| Cardanol (vacuum distilled) | 288 |
| Decylphenol (para) | 232 |
| Formaldehyde (37%) | 178 |
| Concentrated HCl | 3.5 |
| Xylene | 300 |
| Monoalkyl ($C_{10}$–$C_{20}$, principally $C_{12}$–$C_{14}$) benzene monosulfonic acid sodium salt | 1.8 |

The procedure followed was the same as described in the preceding Example 1ª. The resin obtained was reddish-amber in color and semi-fluid in consistency.

EXAMPLE 55ª

A resin was prepared in the manner described under Example 48ª, preceding. Such resin was subjected to vacuum distillation in the following manner: It was stripped of xylene by heating to a temperature of 200° C. at a vacuum of 25 mm. (Hg). The resin obtained was reddish-black in color and extremely tacky and semi-pliable. It was definitely more viscous or more nearly like a solid in consistency than the parent resin which had not been subjected to distillation. The resin was, of course, xylene-soluble.

EXAMPLE 56ª

| | Grams |
|---|---|
| Cardanol (vacuum distilled) | 288 |
| Methylphenol | 232 |
| Acetaldehyde | 88 |
| Concentrated sulfuric acid | 5 |
| Xylene | 100 |

The procedure followed was the same as described under the heading of Example 3ª, preceding. The resin obtained was dark red, and soft to semi-tacky in consistency.

EXAMPLE 57ª

| | Grams |
|---|---|
| Cardanol (vacuum distilled) | 288 |
| Methylphenol | 232 |
| Butyraldehyde | 144 |
| Concentrated sulfuric acid | 5 |
| Xylene | 100 |

The procedure followed was the same as described under the heading of Example 4ª, preceding. The resin was dark red in color and soft to fluid in consistency. The final solution contained 13.5% xylene.

EXAMPLE 58ª

| | Grams |
|---|---|
| Cardanol (vacuum distilled) | 230 |
| Para-phenylphenol | 34 |
| Formaldehyde | 80 |
| Concentrated HCl | 1 |
| Monoalkyl ($C_{10}$–$C_{20}$, principally $C_{12}$–$C_{14}$) benbene monosulfonic acid sodium salt | 1 |
| Xylene | 150 |

The procedure followed was the same as described in Example 1ª, preceding. The solvent-free resin was dark red or reddish-brown in color, semi-solid and somewhat pliable, but was dispersible in xylene but not completely soluble. The solution as prepared contained 35% xylene.

EXAMPLE 59ª

| | Grams |
|---|---|
| Hydrogenated cardanol | 144 |
| Amylphenol | 164 |
| Formaldehyde (37%) | 120 |
| Concentrated HCl | 2.5 |
| Monoalkyl ($C_{10}$–$C_{20}$, principally $C_{12}$–$C_{14}$) benzene monosulfonic acid sodium salt | 1.5 |
| Xylene | 250 |

The procedure followed was that described in Example 1ª, preceding. The resin obtained was a hard, brittle product, xylene-soluble. The solvent-free resin had a melting point of 105° C. The resin as prepared contained 43% xylene.

EXAMPLE 60ª

| | Grams |
|---|---|
| Cardanol (vacuum distilled) | 576 |
| Paracresol | 54 |
| Phenol | 47 |
| Formaldehyde (37%) | 240 |
| Concentrated HCl | 4.5 |
| Monoalkyl ($C_{10}$–$C_{20}$, principally $C_{12}$–$C_{14}$) benzene sulfonic acid sodium salt | 3 |

The same equipment and the same procedure was followed as in Example 1ª, preceding. The resin was soft and pliable in consistency and xylene-soluble.

EXAMPLE 61ª

| | Grams |
|---|---|
| Cardanol (vacuum distilled) | 144 |
| Para-nonylphenol | 264 |
| Metacresol | 32.4 |
| Formaldehyde (37%) | 162 |
| Ammonia (26° Baumé or about 28%) | 21 |
| Xylene | 350 |

The procedure employed was the same as described under Example 2ª, preceding.

EXAMPLE 62ª

| | Grams |
|---|---|
| Cardanol (vacuum distilled) | 288 |
| Ortho or para-cresol | 27 |
| Metacresol | 27 |
| Concentrated sulfuric acid | 3 |
| Acetaldehyde | 66 |
| Xylene | 100 |

The procedure followed was the same as in Example 5ª, except that the residual xylene added was 50 grams instead of 150, for the reason that the total amount of xylene was 100 grams instead of 200. The final resin was soft, almost fluid, soluble in xylene and other conventional solvents.

EXAMPLE 63a

The same procedure was followed as in Example 62a, except the amount of cardanol employed was reduced to 268.2 grams and the amount of cresol increased to 178.8 grams, of which 1/3 was metacresol and 2/3 ortho or para-cresol, or a mixture thereof.

EXAMPLE 64a

The same procedure was followed as in Example 62a, except that the amount of cardanol employed was reduced to 137.3 grams and the amount of cresol increased to 268.0 grams, of which 1/3 was metacresol and 2/3 ortho or para-cresol, or a mixture thereof.

EXAMPLE 65a

The same procedure was followed as in Examples 62a, 63a and 7a, except that para-ethylphenol, para-propylphenol, para-butylphenol, para-amylphenol, or para-octylphenol was substituted in molar equivalent amounts for the ortho or para-cresol.

EXAMPLE 66a

| | Grams |
|---|---|
| Cardanol | 288 |
| Para-ethylphenol | 35.5 |
| Phenol | 23.5 |
| Acetaldehyde | 66 |
| Concentrated sulfuric acid | 3 |
| Xylene | 100 |

The procedure followed was the same as that described in Example 3a, with the change in the amount of residual xylene added so as to conform to Example 58a.

EXAMPLE 67a

| | Grams |
|---|---|
| Cardanol (vacuum distilled) | 288 |
| Para-tertiary butylphenol | 37.5 |
| Phenol | 23.5 |
| Concentrated sulfuric acid | 3 |
| Acetaldehyde | 66 |
| Xylene | 100 |

The procedure followed was the same as that described in Example 3a, with the change in the amount of residual xylene added so as to conform to Example 58a. The final product was a soft, amber-colored resin.

The same procedure as in the two preceding examples, but with the use of normal butyraldehyde and normal heptaldehyde in molar quantities to replace the acetaldehyde, gives resulting resins of the same general appearance.

EXAMPLE 68a

| | Grams |
|---|---|
| Cardanol | 86.4 |
| Phenol | 9.4 |
| Para-ethylphenol | 12.2 |
| Formaldehyde (37%) | 40.0 |
| Concentrated HCl | .8 |
| Monoalkyl ($C_{10}$-$C_{20}$, principally $C_{12}$-$C_{14}$) benzene monosulfonic acid sodium salt | .5 |
| Xylene | 100 |

The procedure followed was the same as that in Example 1a.

EXAMPLE 69a

The same procedure was followed as in the preceding example, except that the para-ethylphenol was replaced by the equivalent molar amount of para-propylphenol, para-butylphenol, para-octylphenol, para-amylphenol, para-phenylphenol, or other difunctional phenol. Further variants include the replacement of the phenol by a molar equivalent amount of metacresol or other low alkyl phenol, for instance, ethyl or propylphenol, providing the alkyl group is in the meta position.

EXAMPLE 70a

The same procedure was followed as in Examples 68a and 69a, except that the molal ratio of cardanol to the other phenols (difunctional and trifunctional phenols) was changed from 3 to 2, to 2½ to 2½, with the same molar proportion of total phenols. Otherwise, the same reactants and same procedures were employed.

EXAMPLE 71a

The same procedure was followed as in Examples 68a and 69a, except that the molal ratio of cardanol to the other phenols (difunctional and trifunctional phenols) was changed from 3 to 2, to 2 to 3, with the same molar proportion of total phenols. Otherwise, the same reactants and same procedures were employed.

EXAMPLE 72a

| | Grams |
|---|---|
| Hydrogenated cardanol | 270 |
| Para-cresol | 20 |
| Phenol (concentrated) | 18 |
| Formaldehyde (37%) | 80 |
| Concentrated HCl | 1.0 |
| Monoalkyl ($C_{10}$-$C_{20}$, principally $C_{12}$-$C_{14}$) benzene monosulfonic acid sodium salt | 1.0 |
| Xylene | 200 |

The procedure followed was the same as in Example 1a. The resulting resin was semi-solid, tacky, and of heavy tar-like consistency.

EXAMPLE 73a

Examples 60a and 61a, preceding, were repeated, replacing cardanol by hydrogenated cardanol. Since the commercial product was not 100% pure, it was not necessary to make any change in proportions because of the slight difference in molecular weight between hydrogenated cardanol and cardanol. However, allowance for this slight increase can be made.

EXAMPLE 74a

| | Grams |
|---|---|
| Chlorinated cardanol | 171 |
| Menthylphenol | 116 |
| Metacresol | 19 |
| Butyraldehyde | 84.5 |
| Concentrated sulfuric acid | 3 |
| Xylene | 250 |

The procedure employed was the same as described under the heading of Example 4a, preceding. The resin obtained was black in appearance and soft to semi-pliable in consistency. The solution as prepared contained 14.6% xylene.

EXAMPLE 75a

| | Grams |
|---|---|
| Cardanol (vacuum distilled) | 195 |
| Nonylphenol | 330 |
| Metacresol | 8.1 |
| Formaldehyde (37%) | 203 |
| Catalyst | None |
| Xylene | 450 |

The procedure followed was substantially the same as described under Examples 15ª and 33ª, preceding. The solvent-free resin was reddish-black in color and soft to semi-pliable in consistency. The final solution contained 55% xylene.

EXAMPLE 76ª

| | Grams |
|---|---|
| Cardanol (vacuum distilled) | 144 |
| Butylphenol | 75 |
| Metacresol | 19 |
| Butyraldehyde | 84.5 |
| Concentrated sulfuric acid | 3.5 |
| Xylene | 200 |

The procedure employed was the same as described under the heading of Example 4ª, preceding. The resin was reddish-black in color and semi-fluid to pliable in consistency.

EXAMPLE 77ª

| | Grams |
|---|---|
| Cardanol (vacuum distilled) | 144 |
| Para-octylphenol | 103 |
| Metacresol | 19 |
| Butyraldehyde | 84.5 |
| Concentrated sulfuric acid | 4.0 |
| Xylene | 225 |

The procedure employed was that described under the heading of Example 4ª, preceding. The resin was reddish-black in color and semi-soft to pliable in consistency.

EXAMPLE 78ª

| | Grams |
|---|---|
| Cardanol (vacuum distilled) | 144 |
| Metacresol | 19 |
| Nonylphenol | 110 |
| Butyraldehyde | 84.5 |
| Concentrated sulfuric acid | 4.0 |
| Xylene | 250 |

The procedure followed was the same as described under the heading of Example 4ª, preceding. The solvent-free resin was soft to semi-tacky in appearance and reddish-black in color. The solution as prepared contained 42.5% xylene.

EXAMPLE 79ª

| | Grams |
|---|---|
| Cardanol (vacuum distilled) | 245 |
| Nonylphenol | 187 |
| Metacresol | 32.4 |
| Furfural | 192 |
| Potassium carbonate | 12 |

The procedure followed was the same as in Example 13ª, preceding, including the addition of 250 grams of xylene. The solvent-free resin was reddish-black in color, xylene-soluble and semi-hard to pliable, with some tackiness in its consistency. The solution as prepared contained 28% xylene.

EXAMPLE 80ª

| | Grams |
|---|---|
| Cardanol (vacuum distilled) | 245 |
| Menthylphenol | 197 |
| Metacresol | 32.4 |
| Heptaldehyde | 228 |
| Concentrated sulfuric acid | 8 |
| Xylene | 350 |

The procedure followed was the same as described under the heading of Example 4ª, preceding. The resin was reddish-amber in color and very viscous or almost suggestive of a solid.

EXAMPLE 81ª

The resin was prepared in the manner described under Example 80ª, preceding. Such resin was subjected to vacuum distillation in the following manner: The maximum temperature employed was 204° C. at a vacuum of 25 mm. (Hg). Under this stripping procedure all the xylene was removed and the resin obtained was reddish-black in color. It was extremely tacky and decidedly more viscous or more nearly solid than the resin prior to vacuum distillation. It was, of course, xylene-soluble.

EXAMPLE 82ª

| | Grams |
|---|---|
| Cardanol (vacuum distilled) | 228 |
| Ethylphenol | 35.5 |
| Phenol | 23.5 |
| Concentrated sulfuric acid | 3.0 |
| Acetaldehyde | 6.0 |
| Xylene | 100 |

The procedure employed was that described under Example 3ª, preceding. The resin was dark to reddish-black in appearance, semi-solid in consistency, and the solution as prepared contained 20% xylene.

EXAMPLE 83ª

| | Grams |
|---|---|
| Cardanol (vacuum distilled) | 144 |
| Nonylphenol | 220 |
| Metacresol | 28.5 |
| Benzaldehyde | 187 |
| Concentrated sulfuric acid | 4.5 |
| Xylene | 350 |

The procedure employed was that described under the heading of Example 4ª, preceding. The solvent-free resin was reddish-black in color and semi-soft to pliable in consistency. The resin as prepared contained 38.9% xylene.

Monofunctional phenols, such as monofunctional diamylphenol, do not yield resins by reaction with formaldehyde, for the simple reason that using conventional procedure one obtains a dimer consisting of two phenolic nuclei joined by methylene or a substituted methylene bridge. On the other hand, where the phenolic reactants are trifunctional, the addition of moderate amounts of a monofunctional phenol tends to prevent or reduce cross-linking, and thus insures the formation of a fusible solvent-soluble resin, i. e., a product which is a resin in the sense that it contains three or more phenolic nuclei and is still sufficiently free from cross-linking to represent discrete particles. Note the use of monofunctional diamylphenol in certain of the preceding examples.

As far as the manufacture of resins is concerned, it is usually most convenient to employ a catalyst such as illustrated by previous examples.

Previous reference has been made to the use of a single phenol of each particular type, or a single aldehyde, or a single oxyalkylating agent. Obviously, mixtures of reactants may be employed, as, for example, a mixture of cardanol and hydrogenated cardanol, or a mixture of phenol and metacresol, or a mixture of amylphenol and butylphenol. It is extremely difficult to depict the structure of a resin made from a single difunctional phenol, as, for example, from para-amylphenol and formaldehyde. When a mixture of phenols is used, and this is particularly true when such mixtures are selected exclusively from trifunctional phenols having a long chain substituent in the meta position, or at least include a considerable amount of such phenol, one runs into even greater complexity of structure.

If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins in what would actually be a mechanical mixture, although such mixture might exhibit some unique properties, as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the use of oxyalkylated derivatives of such resins, derived from such plurality of reactants instead of being limited to a single reactant from each of the three classes, is contemplated and here included, for the reason that they are obvious variants.

Having obtained a suitable resin of the kind described, such resin is subjected to treatment with a low molal reactive alpha-beta olefine oxide so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxy propylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3, and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from nimium hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property of sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner, but one may employ an emulsification test. Emulsions come into existence, as a rule, through the presence of a surface-active emulsifying agent. Some surface-active emulsifying agents such as mahogany soap may produce a water-in-oil emulsion, or an oil-in-water emulsion, depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type), which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation, using 2 moles of ethylene oxide for each phenolic hydroxyl, is helpful.

The procedure followed in preparing such a "standard" resin for comparison was the same procedure as described in Example 1a, preceding. A specific example of ingredients suitable for making such resin is as follows:

|  | Grams |
|---|---|
| Para-tertiary butylphenol (1.0 mole) | 150 |
| Formaldehyde (37%) (1.1 mole) | 90 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

Such resin, prior to oxyalkylation, has a molecular weight indicating about 4½ units per resin molecule. Such resin, when diluted with an equal weight of xylene, will serve to illustrate the above emulsification test.

In a few instances, the resin may not be sufficiently soluble in xylene alone, but may require the addition of some ethylene glycol diethyl ether, as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in the presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher mo'ecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a mater of fact, it is probable that in acid-catalyzed resinifications. the methylol structure may appear only momentarily at the very beginning of the reaction and in all probability is converted at once into a more complex structure during the intermediate stage.

One procedure which can be employed in the use of a new resin to prepare products for use in the process of the invention is to determine the hydroxyl value by the Verley-Bölsing method or its equivalent. The resin, as such, or in the form of a solution, as described, is then treated with ethylene oxide in presence of 0.5% to 2% of sodium methylate as a catalyst in step-wise fashion. The conditions of reaction, as far as time or percent are concerned, are within the range previously indicated. With suitable agitation, the ethylene oxide, if added in molecular proportion, combines within a comparatively short time, for instance. a few minutes to 2 to 6 hours, but in some instance, requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50%, by weight, of the original resin, a sample is tested for incipient hydrophile properties, by simply shaking up in water as is, or after the elimination of the solvent, if a solvent is present. The amount of ethylene oxide used to obtain a useful demulsifying agent. as a rule, varies from 70%, by weight, of the original resin to as much as five or six times the weight of the original resin. In the case of a resin derived from para-tertiary butylphenol and cardanol, or cardanol in combination with para-cresol, or in combination with meta-cresol, or in combination with both meta and para-cresol, as little as 50%, by weight, of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in a comparatively thin layer, for instance, the depth of a test tube. Ultimate hydrophile character is usually shown at the 15 to 1 ratio test, in that adding a small amount of an insoluble solvent, for instance, 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75%, by weight, for example, 65%, by weight, of the resin to be oxyethylated; a second example using approximately 200% to 300%, by weight, and a third example, using about 500% to 750%, by weight, to explore the range of hydrophile-hydrophobe balance.

A practical examination of the factor of oxyalkylation level can be made by a very simple test, using a pilot plant autoclave having a capacity of about 10 to 15 gallons, as hereinafter described. Such laboratory-prepared routine compounds can then be tested for solubility, and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydophile-hydophobe range.

Ordinarily, the oxyalkylation is carried out in autoclaves provided with agitators or stirring devices. We have found that the speed of the agitation markedly influences the time of reaction. In some cases, the change from slow speed agitation, for example, in a laboratory autoclave agitation with a stirrer operating at a speed of 60 to 200 R. P. M. to high speed agitation, with the stirrer operating at 250 to 350 R. P. M., reduces the time required for oxyalkylation by about one-half to two-thirds. Frequently xylene-soluble products which give insoluble products by procedures employing comparatively slow speed agitation give suitable hydrophile products when produced by similar procedure, but with high speed agitation, as a result, we believe of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

As far as we know, some thermoplastic or fusible cardanol or mixed cardanol resins are offered in the open market for purposes other than those herein described. If one obtains such a resin, one might have to make certain determinations, in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which may be a cardanol type resin alone or a hydrogenated cardanol type, or a chlorinated cardanol type, or the resin obtained from a mixture, as previously described. With such information one is in substantially the same position as if one had personally made the resin prior to oxyethlylation.

In the instant case, such a variety of phenols may be employed that it is somewhat difficult to calculate a molecular weight, except as a statistical average. If, on the other hand, a resin is obtained from a single phenol, such as cardanol, then the molecular weight of the internal structural units of the resin of the following over-simplified formula:

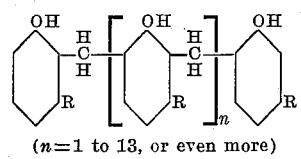

($n=1$ to 13, or even more)

is given approximately by the formula: (mol. wt. of phenol $-2$) plus mol. wt. of methylene or substituted methylene radical. The molecular weight of the resin would be $n$ times the value for the internal limit plus the values for the terminal units. The left-hand terminal unit of the above structural formula, it will be seen, is identical with the recurring internal unit, except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei, as in the structure shown, this calculation will be in error by several percent, but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

The following examples, 1ᵇ through 9ᵇ, are included to exemplify the production of oxyalkylation products of the invention from resins, specifically, resins described in nine of the foregoing Examples 1ᵃ to 82ᵃ, giving exact and complete details for the carrying out of the procedure. In the table which appears further on in the specification are given data with respect to the oxyethylation of a number of the resins previously described, it being understood that in preparing the products referred to in the table, the manipulative steps used are those of Examples 1ᵇ to 9ᵇ.

EXAMPLE 1ᵇ

The resin employed was the acid-catalyzed cardanol formaldehyde resin of Example 1ᵃ. It is possible that resins of this type are available in the open market, but in any event, such resin can be prepared following prior directions. The resin is mixed with an equal weight of solvent, such as xylene. In the particular experiment 8.323 grams of resin solution was employed. This contained 49% of solvent and 51% of resin. This was equivalent to approximately 4200 grams of resin. The catalyst employed is the one which we prefer, to wit, powdered sodium methylate. The amount of sodium methylate employed was 2.6% based on the weight of the solvent-free resin. This mixture, to wit, the resin, xylene and the sodium methylate powder, is placed in an autoclave and approximately 5850 grams of ethylene oxide add in six portions of 900 grams in the first five, and 1350 in the last addition. After each portion is added, the reaction is allowed to take place until it is complete, as indicated by the drop in pressure to that of the solvent alone. This particular resin seemed to be particularly susceptible to oxyethylation, and in each case, the addition of ethylene oxide was made in less than an hour, usually requiring 15 minutes to thirty minutes. The temperature employed varied from approximately 113° to 155° C. The gauge pressure stayed low on the first four additions, i. e., it varied from 50 pounds to 80 pounds per square inch. On the fifth addition, the gauge pressure became rather high, rising to 250 pounds. On the last addition it was low again, back to 50 pounds. Tests were made on the solubility of the oxyethylated product as oxyethylation proceeded. The product at the end of the sixth addition was completely water-soluble. Reference is made to the hereto appended table, where all these data are tabulated. This indicated that incipient emulsification in absence of xylene may have appeared at an earlier stage, for instance, at the fifth addition, or possibly even at the fourth addition. The original amount of resin employed, 4200 grams, was rendered water-soluble when an equal weight of ethylene oxide was added, and possibly fairly soluble when, at the end of the fourth addition, 3600 grams of ethylene oxide were added. As previously pointed out, a more exact evaluation is possible, if the xylene or other solvent is removed. The final product, when cold, was a somewhat viscous liquid, reddish-amber in color, and as stated, was emulsifiable in water, even in the presence of added xylene.

EXAMPLE 2$^b$

The same reactants, and procedure, were employed as in Example 1$^b$, preceding, except that propylene oxide was employed instead of ethylene oxide. The resultant, even on the addition of the alkylene oxide in the weight proportions of the previous example, has diminished hydrophile properties, in comparison with the resultants of Example 1$^b$. This illustrates the point that propylene oxide and butylene oxide give products of lower levels of hydrophile properties than does ethylene oxide.

EXAMPLE 3$^b$

The same reactants and procedure were followed as in Example 1$^b$, except that one mole of glycide was employed initially per hydroxy radical. This particular reaction was conducted with extreme care and the glycide was added in small amounts representing fractions of a mole. Ethylene oxide was then added, following the procedure of Example 1$^b$, to produce products of greater hydrophile properties. We are extremely hesitant to suggest even the experimental use of glycide and methyl-glycide, for the reason that disastrous results may be obtained even in experimentation with laboratory quantities.

EXAMPLE 4$^b$

The same procedure was followed as in Example 1$^b$, except that instead of employing the resin used in Example 1$^b$, there was used instead the cardanol formaldehyde resin obtained by means of an alkaline catalyst (ammonia) as described under the heading of Example 2$^a$.

EXAMPLE 5$^b$

The procedure employed was the same as that in Example 1$^b$, except that instead of using the resin described under the heading Example 1$^a$, there was employed instead the resin described under the heading Example 3$^a$. This particular resin was obtained from cardanol and acetaldehyde, employing concentrated sulfuric acid as a catalyst. As to the details of the oxyethylation procedure, see the hereto appended table.

EXAMPLE 6$^b$

The same procedure was employed as in Example 1$^b$, preceding, except that the resin employed was the particular one described under the heading of Example 16$^a$. This resin was derived from cardanol in combination with phenol. It was a formaldehyde resin obtained by means of an acid catalyst. The details of oxyethylation are set forth in a subsequent table.

EXAMPLE 7$^b$

The procedure followed was the same as in Example 1$^b$, preceding, but the resin employed was one derived from cardanol and a difunctional phenol, to wit, a difunctional cresol. The resin was the one described under the heading of Example 37$^a$. The details of oxyethylation appear in the table.

EXAMPLE 8$^b$

The procedure followed was the same as in Example 1$^b$, preceding. The resin employed was a resin obtained from cardanol in combination with both a difunctional phenol and a trifunctional phenol. The specific resin was that described under the heading of Example 62$^a$. As to details of oxyethylation, see the hereto appended table.

EXAMPLE 9$^b$

The same procedure was followed as in Example 1$^b$ preceding. The particular resin employed was one obtained from cardanol in combination with both a difunctional phenol and a trifunctional phenol, but employing acetaldehyde instead of formaldehyde. The particular resin is obtained under the heading of Example 66$^a$. As to details of oxyethylation, see the table that follows.

Our experience with chlorinated reactants during oxyalkylation, particularly oxyethylation, is that an alkaline catalyst is not apt to be satisfactory if the chlorine shows any liability at all. This is usually the case, and, as a result, the alkaline catalyst is converted into sodium chloride with the corresponding change in the organic reactant. In such instances, we prefer to use the type of reactant employed in a Friedel-Crafts reaction. Such catalyst is an acid in some of the common systems of acid based nomenclature. Examples include aluminum chloride, ferric chloride, stannic chloride, etc. In the oxyethylation of Examples 10$^a$, 29$^a$, 46$^a$ and 74$^a$, as previously described, and described in further detail in the subsequent table, tin tetrachloride was used instead of sodium methylate.

The resins, prior to oxyethylation, vary from tacky resins having a suggestion of hardness, to tacky viscous liquids. Their color varies from a reddish-amber to a blackish-amber, particularly in the latter direction when the amount of cardanol or cardanol derivative increases. In the manufacture of resins, as the reaction progresses, the reaction mass frequently goes through a liquid stage, to a sub-resinous state, and then reaches the final tacky appearance, which is characteristic of these resins having a long chain substituent. As the resin is subjected to oxyethylation, these same physical changes tend to take place in revesse. If one starts with a viscous tacky resin, incipient oxyalkylation tends to make it tacky and somewhat more liquid, and further oxyalklation makes the tackiness disappear and changes the product to a liquid. Thus, as the resin is oxyalkylated, it decreases in viscosity, i. e., becomes more liquid or changes from a solid to a liquid, particularly when it is converted to the water-dispersible or water-soluble stage. The color of the oxyalkylated derivative is usually considerably lighter than the original product from which it is made, varying from a deep straw color to an amber or reddish-amber. The viscosity usually varies from that of an oil, like castor oil, to that of a thick, viscous syrup. Some products are waxy. The presence of a solvent, such as 15% xylene or the like, thins the viscosity considerably and also reduces the color in dilution. No undue significance need be attached to the color, for the reason that if the same compound is prepared in glass and in iron, the latter usually has somewhat darker color. If the resins are prepared, as customarily employed in varnish resin manufacture, i. e., a procedure that excludes the presence of oxygen during the resinification and subsequent cooling of the resin, then, of course, the initial resin is much lighter in color. We have employed some resins which initially are almost water-white and also yield a lighter colored final prodct.

The same procedure as described above has been applied to a large variety of resins of the kind described previously, including resins obtained from mixtures of phenols, and we have found that these oxyalkylated products having the required minimum hydrophile properties, are all effective for use in the process of the invention. In many cases resins used were obtained from aldehydes other than formaldehyde, i. e., higher aldehydes having not over 8 carbon atoms. Similarly, some of the resins, instead of being obtained by use of acid catalysts, were obtained by use of alkaline catalysts or sequential use of both types of catalyst. In some instances, the resins were obtained by a process which involved a secondary step, if heating alone or under vacuum. In the series of examples represented by Examples $1^b$ through $9^b$, the amount of alkylene oxide added covers the range up to about three times the weight of the initial resin. The data given in the table which follows show that many of the most effective compounds for demulsification purposes require but about one-half this amount of alkylene oxide, in particular ethylene oxide, for example, from 150% to possibly 200%, by weight. Larger amounts of ethylene oxide, for example, amounts up to six times the weight of the initial resin may be used, even though the solubility of such products may in some cases be less than the solubility of derivatives obtained with lesser amounts of alkylene oxide.

The table which follows gives data with respect to the preparation and properties of a series of oxyethylated resins which have been tested for demulsifying action on a number of crude oil emulsions. Each product was obtained by the oxyethylation of a product of one of Examples $1^a$ through $68^a$. The tabulated data include the example number, in which the preparation of the resin is described and the resin is identified, the amount of ethylene oxide added per weight of resin, the amount and nature of the catalyst used for the oxyethylation operations, the number of steps in which the oxyethylation was carried out, the hydrophile properties not only of the final product, but of intermediate products, the temperatures used in the oxyethylation steps, the maximum pressures (gauge) of the oxyethylation steps and the length of time required for each step. The technique used was that described in Example $1^b$.

In the table, the first column on each page gives the example number, thus identifying the resin used. Column A gives the weight of the resin solution used in grams, column B the percentage of solvent in the resin solution used, and column C the percent of alkaline catalyst (sodium methylate) based on amount of resin used in the oxyethylation. Column $D_1$ through $H_5$ give the data with respect to oxyethylation operations, column $D_1$ giving the maximum temperature in degrees C, column $E_1$ the gauge pressure in pounds per square inch, column $F_1$ the number of grams of ethylene oxide added in the first addition, column $G_1$ the time required for the first addition in hours, and column $H_1$ the hydrophile properties of the product resulting from the first addition. Columns $D_2$ through $H_2$ give similar data for the second addition of ethylene oxide, columns $D_3$ through $H_3$ similar data for the third addition, etc.

*Table*

| Example Number | Resin | | | Additions of Ethylene Oxide—First Addition | | | | |
|---|---|---|---|---|---|---|---|---|
| | A | B | C | $D_1$ | $E_1$ | $F_1$ | $G_1$ | $H_1$ |
| $1^a$ | 8232 | 49.0 | 2.6 | 113 | 80 | 900 | ¼ | Insoluble. |
| $2^a$ | 400 | 50.0 | 2.5 | 156 | 120 | 100 | 20 | Do. |
| $3^a$ | 400 | 50.0 | 2.0 | 158 | 165 | 100 | 33 | Emulsifiable. |
| $4^a$ | 455 | 37.0 | 1.4 | 160 | 165 | 100 | 24 | Do. |
| $5^a$ | 496 | 35.0 | 2.2 | 156 | 160 | 100 | 20 | Do. |
| $10^{a\,1}$ | 536 | 47.0 | 2.45 | 165 | 280 | 150 | 1¾ | Insoluble. |
| $11^a$ | 529 | 43.0 | 2.7 | 160 | 210 | 150 | 5 | Do. |
| $12^a$ | 372 | 70.0 | 3.5 | 150 | 140 | 160 | 2¾ | Red Rubbery Mass; viscous; Not emul. |
| $13^a$ | 625 | 37.0 | 2.3 | 150 | 180 | 150 | ½ | Not emulsifiable. |
| $14^a$ | 574 | 50.0 | 2.4 | 175 | 200 | 150 | ½ | Do. |
| $15^a$ | 616 | 63.0 | 3.3 | 205 | 160 | 160 | ⅓ | Red amber salve-like; somewhat emulsifiable. |
| $16^a$ | 408 | 41.8 | 1.7 | 150 | 140 | 50 | 9 | Insoluble. |
| $17^a$ | 317 | 38.8 | 2.8 | 150 | 146 | 100 | 4 | Do. |
| $23^a$ | 533 | 33.0 | 2.5 | 188 | 125 | 110 | 8 min. | Do. |
| $28^a$ | 499 | 51.0 | 2.5 | 160 | 175 | 150 | ¾ | Do. |
| $29^{a\,1}$ | 413 | 57.5 | 1.1 | 158 | 180 | 150 | 2½ | Not soluble. |
| $30^a$ | 454 | 47.0 | 2.7 | 160 | 210 | 150 | ½ | Not emulsifiable. |

Table—Continued

| Example Number | Resin | | | Additions of Ethylene Oxide—First Addition | | | | |
|---|---|---|---|---|---|---|---|---|
| | A | B | C | $D_1$ | $E_1$ | $F_1$ | $G_1$ | $H_1$ |
| 31a | 541 | 40.5 | 2.5 | 192 | 170 | 150 | ¼ | Not emulsifiable. |
| 32a | 560 | 50.0 | 2.5 | 190 | 180 | 150 | ½ | Do. |
| 33a | 500 | 43.0 | 3.2 | 185 | 195 | 150 | ½ | Do. |
| 37a | 310 | 35.0 | 2.5 | 160 | 140 | 100 | 10 | Insoluble. |
| 43a | 264 | 36.4 | 2.4 | 158 | 110 | 50 | 7 | Emulsifiable. |
| 44a | 313 | 39.6 | 2.0 | 160 | 150 | 100 | 7½ | Do. |
| 46a [1] | 499 | 45.0 | 1.0 | 160 | 90 | 50 | 6 | Not emulsifiable. |
| 47a | 529 | 29.0 | 2.1 | 160 | 180 | 150 | ¾ | Somewhat emuls. |
| 48a | 471 | 33.0 | 2.5 | 175 | 200 | 160 | 7 min. | Not emulsifiable. |
| 50a | 644 | 58.0 | 2.4 | 154 | 200 | 160 | 1 | Do. |
| 51a | 635 | 39.0 | 2.3 | 170 | 150 | 150 | ⅙ | Do. |
| 52a | 460 | 74.0 | 3.3 | 150 | 210 | 160 | 1½ | Do. |
| 53a | 816.5 | 80.0 | 3.7 | 175 | 150 | 160 | ½ | Somewhat emuls. |
| 54a | 506 | 47.0 | 2.5 | 168 | 210 | 150 | 2 | Insoluble. |
| 55a | 482 | 50.0 | 2.8 | 185 | 220 | 150 | ¼ | Not emulsifiable. |
| 56a | 476 | 15.0 | 2.0 | 150 | 160 | 100 | 3 | Somewhat emuls. |
| 57a | 508 | 13.0 | 1.1 | 156 | 105 | 100 | 3 | Not soluble. |
| 58a | 307 | 34.0 | 2.0 | 140 | 115 | 100 | 6 | Somewhat emuls. |
| 59a | 409 | 43.0 | 1.7 | 156 | 110 | 100 | 5½ | Water-insoluble. |
| 61a | 619 | 43.0 | 2.3 | 167 | 160 | 150 | 2 | Not emulsifiable. |
| 62a | 512 | 39.0 | 2.0 | 140 | 170 | 160 | 1 | Emulsifiable. |
| 66a | 375 | 20.0 | 2.0 | 154 | 75 | 100 | 6½ | Insoluble. |
| 67a | 352 | 19.9 | 1.4 | 160 | 150 | 100 | 3 | Emulsifiable. |
| 74a [1] | 489 | 41.0 | 1.0 | 155 | 110 | 100 | 1½ | Non-emulsifiable. |
| 75a | 500 | 55.0 | 3.1 | 175 | 195 | 150 | ½ | Do. |
| 76a | 453.5 | 40.0 | 2.9 | 163 | 210 | 150 | 2⅝ | Insoluble. |
| 77a | 512 | 40.5 | 2.6 | 160 | 210 | 150 | 5 | Not emulsifiable. |
| 78a | 473 | 22.5 | 2.9 | 168 | 215 | 150 | 5½ | Insoluble. |
| 79a | 486 | 50.0 | 2.9 | 175 | 180 | 150 | ¼ | Not emulsifiable. |
| 80a | 588 | 39.0 | 2.3 | 170 | 200 | 150 | 2½ | Insoluble. |
| 81a | 536 | 50.0 | 2.6 | 204 | 190 | 150 | 8 min. | Not emulsifiable. |
| 82a | 375 | 20.0 | 1.0 | 154 | 75 | 100 | 6½ | Do. |
| 83a | 451 | 35.0 | 2.4 | 180 | 135 | 100 | ⅙ | Do. |

[1] Tin tetrachloride used as a catalyst instead of sodium methylate.

| Example No. | Additions of Ethylene Oxide—Second Addition | | | | |
|---|---|---|---|---|---|
| | $D_2$ | $E_2$ | $F_2$ | $G_2$ | $H_2$ |
| 1a | 115 | 65 | 900 | ½ | Insoluble. |
| 2a | 166 | 105 | 100 | 7 | Do. |
| 3a | 166 | 135 | 100 | 22 | Emulsifiable. |
| 4a | 152 | 150 | 100 | 14 | Do. |
| 5a | 160 | 165 | 100 | 48 | Do. |
| 10a [1] | 165 | 195 | 150 | 2¼ | Tendency towards solubility. |
| 11a | 158 | 200 | 150 | 1¾ | Non-emulsifiable. |
| 12a | 160 | 160 | 160 | 1 | Red-black gum-like mass; not completely soluble. |
| 13a | 155 | 150 | 150 | 1/12 | Partially soluble. |
| 14a | 165 | 200 | 150 | ⅚ | Somewhat emulsifiable. |
| 15a | 180 | 160 | 160 | ⅔ | Emulsifiable.[2] |
| 16a | 150 | 145 | 50 | 12 | Emulsifiable. |
| 17a | 175 | 189 | 100 | 5½ | Somewhat soluble. |
| 23a | 200 | 170 | 150 | 1/12 | Emulsifiable. |
| 28a | 155 | 170 | 150 | ⅔ | Not soluble. |
| 29a [1] | 157 | 225 | 150 | 2 | Emulsifiable. |
| 30a | 175 | 200 | 150 | ¼ | Not emulsifiable. |
| 31a | 200 | 175 | 150 | 1/20 | Do. |
| 32a | 165 | 205 | 150 | ⅚ | Somewhat emulsifiable. |
| 33a | 170 | 200 | 150 | 1 | Viscous stringy mass; water-emulsifiable. |
| 37a | 160 | 185 | 100 | 6 | Emulsifiable. |
| 43a | 150 | 145 | 50 | 14 | Do. |
| 44a | 156 | 170 | 100 | 8½ | Do. |
| 46a [1] | 165 | 205 | 150 | 6½ | Insoluble. |
| 47a | 155 | 185 | 150 | ½ | Almost emulsifiable. |
| 48a | 165 | 180 | 150 | 8 min. | Emulsifiable. |
| 50a | 170 | 240 | 170 | 1 | Non-emulsifiable. |
| 51a | 175 | 150 | 150 | 1/12 | Do. |
| 52a | 185 | 200 | 150 | ½ | Pale amber non-homogeneous emulsifiable liquid. |
| 53a | 170 | 175 | 160 | 1 | Viscous salve-like water-emulsifiable mass.[2] |
| 54a | 165 | 190 | 150 | 3 | Somewhat emulsifiable. |
| 55a | 166 | 220 | 150 | 1¼ | Emulsifiable. |
| 56a | 156 | 125 | 100 | 6¼ | Water emulsifiable. |
| 57a | 154 | 130 | 100 | 10 | Not emulsifiable. |
| 58a | 140 | 115 | 100 | 6¾ | Emulsifiable soluble. |
| 59a | 150 | 165 | 100 | 7 | Somewhat soluble, tending to rubberize; extremely stable; faster stirring indicated. |
| 61a | 160 | 190 | 150 | 4½ | Somewhat emulsifiable. |
| 62a | 155 | 185 | 160 | ¾ | Emulsifiable. |
| 66a | 160 | 170 | 100 | 10 | Do. |
| 67a | 158 | 115 | 100 | 6 | Do. |
| 74a | 158 | 165 | 150 | 2½ | Tendency to emulsify. |
| 75a | 155 | 205 | 150 | 2 | Emulsifiable. |
| 76a | 168 | 240 | 150 | 1¼ | Do. |
| 77a | 170 | 210 | 150 | 1¾ | Do. |
| 78a | 168 | 235 | 150 | 1½ | Tendency towards emulsifiability. |
| 79a | 170 | 180 | 150 | 7 min. | Emulsifiable. |
| 80a | 150 | 200 | 150 | 1 | Not soluble. |
| 81a | 194 | 140 | 150 | 1/20 | Emulsifiable. |
| 82a | 160 | 170 | 100 | 10 | Somewhat emulsifiable.[3] |
| 83a | 198 | 155 | 150 | 7 min. | Emulsifiable. |

[1] Tin Tetrachloride used as a catalyst instead of sodium methylate.
[2] 100 grams of diethyl diethyleneglycol added to thin at this point.
[3] After 5 hours, 8 grams more sodium methylate added and run for another 5 hours, totaling 10 hours.

Table—Continued

| Example Number | Additions of Ethylene Oxide Third Addition | | | | |
|---|---|---|---|---|---|
| | $D_3$ | $E_3$ | $F_3$ | $G_3$ | $H_3$ |
| 1a | 150 | 70 | 900 | 1/4 | Emulsifiable. |
| 2a | 166 | 150 | 200 | 7 | Do. |
| 3a | 166 | 160 | 100 | 22 | Do. |
| 4a | 160 | 140 | 100 | 24 | Do. |
| 5a | 162 | 165 | 100 | 6 1/2 | Do. |
| 10a [1] | 166 | 185 | 100 | 3 | Beginning to emulsify. |
| 11a | 155 | 220 | 150 | 1 1/4 | Semi-emulsifiable. |
| 13a | 165 | 120 | 150 | 1/12 | Water-soluble. |
| 14a | 180 | 158 | 150 | 1/2 | Partially-soluble. |
| 15a | 185 | 150 | 160 | 1/3 | Viscous grease-like mass; water-soluble; would be more so without solvent. |
| 16a | 145 | 125 | 50 | 12 | Emulsifiable. |
| 17a | 190 | 160 | 100 | 2 3/4 | More soluble, but tending to get rubbery. |
| 23a | 195 | 140 | 150 | 1/12 | Emulsifiable. |
| 28a | 150 | 165 | 150 | 2/3 | Somewhat soluble. |
| 29a [1] | 160 | 190 | 150 | 2 1/4 | Almost soluble. |
| 30a | 170 | 180 | 150 | 5/12 | Partially soluble. |
| 31a | 190 | 135 | 150 | 1/30 | Water-soluble. |
| 32a | 160 | 180 | 150 | 1/2 | Partially soluble. |
| 33a | 165 | 180 | 150 | 1/2 | Water-soluble and stringy; following solvents were added: diethyl diethyleneglycol 150 gr. and xylene 200 grams. |
| 37a | 162 | 100 | 100 | 3 | Emulsifiable. |
| 43a | 150 | 148 | 50 | 9 | Do. |
| 44a | 150 | 100 | 100 | 6 | Do. |
| 46a [1] | 165 | 195 | 150 | 2 1/4 | Do. |
| 47a | 155 | 180 | 150 | 1/2 | Do. |
| 48a | 165 | 140 | 150 | 1/12 | Water-soluble. |
| 50a | 150 | 170 | 170 | 1 1/6 | Beginning to emulsify. |
| 51a | 170 | 170 | 150 | 8 min. | Partially soluble. |
| 52a | 155 | 140 | 160 | 1/2 | Water-soluble. |
| 53a | 175 | 160 | 160 | 1 | Emulsifiable and more so in absence of solvent. |
| 54a | 175 | 205 | 200 | 3 1/2 | Emulsifiable. |
| 55a | 170 | 200 | 150 | 1 | Amber colored fluid; almost soluble; aqueous solution slightly opaque. |
| 56a | 164 | 115 | 100 | 6 | Emulsifiable. |
| 57a | 166 | 75 | 100 | 3 1/2 | Beginning to emulsify. |
| 58a | 142 | 140 | 100 | 6 1/2 | Distinctly emulsifiable. |
| 61a | 160 | 180 | 150 | 2 | Gives curdy suspension. |
| 62a | 156 | 190 | 160 | 1 1/4 | Almost soluble. |
| 66a | 160 | 100 | 100 | 4 | Emulsifiable. |
| 67a | 158 | 95 | 100 | 6 | Do. |
| 74a [1] | 167 | 220 | 150 | 2 5/6 | Do. |
| 75a | 165 | 185 | 150 | 1 1/6 | Water-soluble. |
| 76a | 165 | 220 | 150 | 1 3/4 | Emulsifiable. |
| 77a | 150 | 120 | 150 | 1 1/4 | Do. |
| 78a | 165 | 210 | 150 | 2 | Do. |
| 79a | 165 | 170 | 150 | 1/10 | Water-soluble reddish-black liquid. |
| 80a | 170 | 230 | 150 | 1 5/6 | Partially soluble. |
| 81a | 194 | 145 | 150 | 1/12 | Reddish-amber liquid, water-soluble. |
| 82a | 160 | 100 | 100 | 4 | Gives milky emulsion. |
| 83a | 194 | 150 | 160 | 1/12 | Water-soluble. |

[1] Tin tetrachloride used as a catalyst instead of sodium methylate.

| Example Number | Additions of Ethylene Oxide—Fourth Addition | | | | |
|---|---|---|---|---|---|
| | $D_4$ | $E_4$ | $F_4$ | $G_4$ | $H_4$ |
| 1a | 115 | 50 | 900 | 1/4 | Becoming soluble. |
| 2a | 167 | 90 | 100 | 6 1/2 | Emulsifiable. |
| 3a | 168 | 165 | 100 | 22 | Almost soluble. |
| 4a | 165 | 165 | 100 | 8 | Emulsifiable. |
| 5a | 146 | 150 | 100 | 6 3/4 | Do. |
| 10a [1] | 150 | 180 | 100 | 2 1/2 | Do. |
| 11a | 170 | 230 | 150 | 2 | Do. |
| 14a | 165 | 140 | 150 | 1 | Soluble with slight curding. |
| 16a | 150 | 90 | 50 | 7 | Emulsifiable. |
| 23a | 194 | 110 | 150 | 1/12 | Soluble. |
| 28a | 185 | 240 | 250 | 1 1/2 | Soluble in water. |
| 29a [1] | 165 | 200 | 150 | 2 1/4 | Almost soluble. |
| 30a | 165 | 140 | 150 | 1/2 | Reddish-amber, water-soluble, somewhat cloudy. |
| 32a | 165 | 140 | 150 | 1 | Fairly soluble, some curding. |
| 37a | 166 | 162 | 100 | 2 | Soluble. |
| 43a | 146 | 140 | 50 | 6 1/2 | Emulsifiable. |
| 44a | 148 | 115 | 100 | 6 1/2 | Almost soluble. |
| 46a [1] | 155 | 215 | 150 | 6 1/4 | Do. |
| 47a | 165 | 170 | 150 | 1 | Water-soluble. |
| 50a | 160 | 160 | 170 | 3/4 | Emulsifiable. |
| 51a | 165 | 120 | 150 | 1 1/2 | Increased solubility. |
| 54a | 186 | 192 | 200 | 4 1/2 | Soluble. |
| 56a | 158 | 110 | 120 | 6 | Water-soluble. |
| 47a | 160 | 100 | 100 | 4 | Watre-emulsifiable. |
| 58a | 156 | 140 | 100 | 7 | Amost water-soluble. |
| 61a | 165 | 170 | 150 | 1 1/2 | More soluble but still curds.[2] |
| 66a | 164 | 120 | 100 | 3 3/4 | Almost soluble. |
| 67a | 160 | 85 | 100 | 5 | Soluble. |
| 74a [1] | 160 | 190 | 150 | 5 1/2 | Emulsifiable. |
| 76a | 165 | 190 | 150 | 1 3/4 | Soluble. |
| 77a | 165 | 220 | 150 | 1 | Do. |
| 78a | 165 | 190 | 150 | 1 3/4 | Water-soluble. |
| 80a | 180 | 230 | 150 | 2 | Emulsifiable. |
| 82a | 164 | 120 | 100 | 3 3/4 | Almost water-soluble. |

[1] Tin Tetrachloride used as a catalyst instead of sodium methylate.
[2] This product thickened in the final stage of oxyethylation and 200 additional grams of xylene were added and not previously recorded.

Table—Continued

| Example Number | Additions of Ethylene Oxide—Fifth Addition | | | | |
|---|---|---|---|---|---|
| | D₅ | E₅ | F₅ | G₅ | H₅ |
| 1ª | 117 | 250 | 900 | ¼ | Almost soluble. |
| 2ª | 166 | 105 | 100 | 4 | Do. |
| 3ª | 166 | 100 | 100 | 18 | Do. |
| 4ª | 168 | 160 | 100 | 7 | Emulsifiable. |
| 5ª | 160 | 175 | 100 | 6 | Becoming soluble. |
| 10ª | 163 | 205 | 150 | 2¼ | Soluble. |
| 11ª | 165 | 195 | 150 | 3 | Partially soluble. |
| 16ª | 155 | 152 | 50 | 10 | Emulsifiable. |
| 43ª | 140 | 142 | 50 | 6 | Do. |
| 44ª | 156 | 175 | 100 | 7 | Almost soluble. |
| 50ª | 165 | 160 | 190 | ⅝ | Viscous salve-like product, reddish amber in color; soluble. |
| 51ª | 170 | 110 | 150 | ⅙ | Water-soluble; reddish-black liquid. |
| 57ª | 162 | 145 | 100 | 3 | Slight increase in solubility. |
| 61ª | 170 | 195 | 150 | 1½ | Not entirely soluble, no longer curds. |
| 66ª | 160 | 120 | 100 | 3 | Soluble. |
| 74ª¹ | 155 | 160 | 150 | 3¼ | Almost soluble. |
| 82ª | 160 | 120 | 100 | 3 | Water-soluble. |

¹ Tin tetrachloride used as a catalyst instead of sodium methylate.

| Example Number | Additions of Ethylene Oxide—Sixth Addition | | | | |
|---|---|---|---|---|---|
| | D₆ | E₆ | F₆ | G₆ | H₆ |
| 1ª | 155 | 50 | 1350 | ½ | Soluble. |
| 2ª | 160 | 125 | 1000 | 18 | Almost soluble. |
| 3ª | 166 | 125 | 200 | 12 | Soluble. |
| 4ª | 158 | 170 | 500 | 28 | Do. |
| 5ª | 154 | 180 | 700 | 29 | Do. |
| 10ª* | 165 | 180 | 150 | 2 | Almost soluble. |
| 16ª | 155 | 140 | 150 | 31 | Emulsifiable. |
| 43ª | 150 | 144 | 100 | 13 | Soluble. |
| 57ª | 154 | 100 | 100 | 7 | Almost water-soluble.† |
| 61ª | 160 | 160 | 150 | 1 | Soluble. |

*Tin tetrachloride used as a catalyst instead of sodium methylate.

| | Seventh addition | | | | |
|---|---|---|---|---|---|
| | D₇ | E₇ | F₇ | G₇ | H₇ |
| †57ª | 164 | 100 | 100 | 2¼ | Water-soluble. |

In appearance the final oxyethylated products in the presence of solvent were, in general, liquids of varying viscosities and varied in color from light amber to dark brown, reddish-brown, or at times were distinctly reddish. It will be noted that in some instances the resins contained nine parts of other phenols to one part of an anacardic acid phenol. At other times, the resin was obtained solely from an anacardic acid phenol, and in other instances, the mixtures contained nine moles of an anacardic acid phenol to one mole of another phenol, or eight moles of an anacardic acid phenol to one mole each of two other types of phenols.

By and large, the viscosity was in the nature of castor oil or a lightly blown castor oil. Some of the products were comparatively non-viscous, others as noted, more so. In some instances, the tables themselves include reference to the viscosity of the products, although this, of itself, is not particularly material, because of the presence of a solvent.

Color, in many cases, is more intimately related to the presence of a trace of iron or presence of some oxidized organic material, or even to the aldehyde used, as in the case of furfural or benzaldehyde.

The foregoing description of the appearance, viscosity, etc., of the final oxyethylated product with respect to which data are given in the table relates to the properties of the products in the presence of the solvent. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

Actually, in considering the ratio of alkylene oxide to add, and we have previously pointed out that this can be predetermined, using laboratory tests, it is our actual preference from a practical standpoint to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or, for that matter, purchase it in the open market. We employ 8 pounds of resin and 4 pounds of xylene and place the resin and xylene in a suitable autoclave with an open reflux condenser. We prefer to heat and stir until the solution is complete.

We have pointed out that the resins obtained from cardanol, cardanol derivatives, or these same phenols in combination with other phenol, such as metacresol or paraamylphenol, are apt to yield soft resins or viscous tacky fluids. If such resins are used, a solvent need not be added, but may be added as a matter of convenience, or for comparison, if desired. We then add a catalyst, for instance, 2% of caustic soda, in the form of a 20% to 30% solution, and remove the water of solution or formation. Attention is directed to what has been said previously about replacing 2% of an alkaline catalyst, such as caustic soda or sodium methylate, with about 1½% or thereabouts of a metallic chloride, such as tin tetrachloride. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points, as indicated in the following table:

| Percentage | Pounds of Ethylene Oxide Added per 8-pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface-activity can be measured in any one of the usual ways, using a Du Nouy tensiometer or dropping pipette, or any other procedure for measuring interfacial tension. Any compound having sub-surface-activity, and all derived from the same resin and oxyalkylated to a greater extent, i. e., those having a greater proportion of alkylene oxide, are useful for the practice of this invention.

We have previously pointed out that when cardanol or cardanol derivatives of the kind herein described are used, either alone or in conjunction with a difunctional phenol, one could add a substantial amount of a trifunctional phenol, such as hydroxy benzene or metacresol. Needless to say, if one obtains an insoluble, infusible, resin from hydroxy benzene or metacresol, the mere addition of a very small proportion of cardanol or cardanol derivative will not render the resin of such mixture soluble and fusible, if the usual procedure is employed. For this reason, we prefer to use a pilot plant test of the kind above described, for the reason that we can use the same procedure to evaluate the acceptability of a mixture containing a trifunctional phenol such as hydroxy benzene or metacresol. This is the same sort of procedure that one would employ to evaluate the tolerance of a resin made solely from a difunctional phenol, such as para-amylphenol, towards the presence of a trifunctional phenol. Previous reference has been made to the fact that one can conduct a laboratory scale test, which will indicate whether or not a resin, although soluble in a solvent, will yield an insoluble rubbery product, i. e., a product which is neither hydrophile nor surface-active upon oxyalkylation, particularly extensive oxyethylation. It is also obvious that one may have a solvent-soluble resin which will result in an insoluble rubber at the ultimate stages of oxyethylation, but not at the earlier stages. In other words, resins from such phenols, and at times, resins obtained from chlorinated cardanol, show this characteristic. The addition of 2 or 3 moles of the oxyalkylating agent per phenolic nucleus, particularly ethylene oxide, gives a surface-active product, which is perfectly satisfactory, while more extensive oxyethylation yields an insoluble rubber, i. e., an unsuitable product It is obvious that this present procedure of evaluating trifunctional phenol tolerance is more suitable than the previous procedure.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency towards a rubbery stage, is not objectionable, so long as the final product is still hydrophile and at least sub-surface active. Such material frequently is best mixed with a polar solvent, such as alcohol or the like, and preferably an alcoholic solution is used. The point which we want to make here, however, is this: Stringiness or rubberization at this stage may possibly be the result of etherification. Obviously, if a suitable phenol and an aldehyde produce a non-cross-linked resin molecule, and if such molecule is oxyalkylated so as to introduce a plurality of hydroxyl groups in each molecule, then and in that event, if subsequent etherification takes place, one is going to obtain cross-linking in the same general way that one would obtain cross-linking in other resinification reactions. Ordinarily, there is little or no tendency towards etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

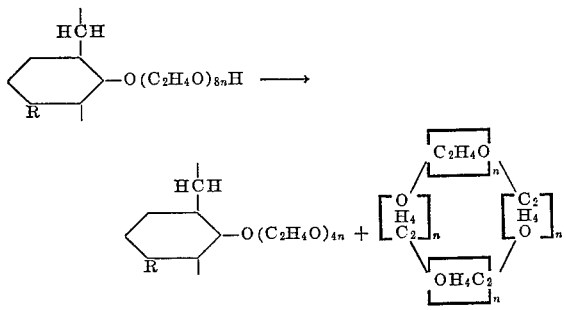

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low-stage resin is subjected to a vacuum distillation treatment as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of dimers from substituted phenols, see Carswell, "Phenoplasts," page 31. The increased viscosity, resinous character, and decreased solubility, etc., of the higher polymers in comparison with the dimer, frequently are all that is required to establish that the resin contains 3 or more structural units per molecule.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or subsurface- or surface-active. Such resins, in turn, are oxyalkylation-susceptible, water-insoluble, organic solvent-soluble, fusible, phenol-aldehyde resins, derived from difunctional phenols having a 2,4,6 hydrocarbon substituent with 4 to 8 carbon atoms. Based on actual large scale application in a large number of oil fields in the United States and certain foreign countries, we believe that this type of material, the oxyalkylated products of fusible solvent-soluble resins, particularly phenol-aldehyde resins, either as such or in the form of derivatives, ultimately will be employed in no less than 50% of all chemical demulsifying agents used throughout the world.

We have employed oxyalkylated cardanol resins of the kind herein described, and in numerous instances, have resolved the emulsions, using 25 parts per million, or less, of the demulsifying agent. In actual commercial use, of course, the use of cardanol resins depends upon whether or not phenol is obtained as economically or more economically than some other competitive phenol, such as para-amylphenol, para-butylphenol, etc.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil.

If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weight, of xylene and 10 parts, by weight, for isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other demulsifying agent, for example, one may employ a mixture such as the following:

Oxyalkylated derivative, for example, the product of Example 1b, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures; one can hydrogenate the resin in a conventional manner, followed by oxyalkylation of the hydrogenated resin in substantially the same manner as is employed in the case of the nonhydrogenated resin. The second procedure is to hydrogenate the oxyalkylated derivative, rather than the resin itself. As an example of such procedure, reference is made to our co-pending applications Serial Nos. 726,201 and 726,204, all filed February 3, 1947, both now abandoned.

In the herein described phenolic mixtures used as reactants, any particular type of phenol, i. e., an anacardic acid phenol or a trifunctional, or difunctional phenol, advantageously is present in such mixture to the extent of at least one mole in 10 moles.

Having thus described our invention, what we claim as new and desire to secure by Letters Patent is:

1. A process for breaking petroleum emulsions of the water-in-oil type, characterized by subjecting the emulsion to the action of a demulsifying agent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic-solvent-soluble, water-insoluble phenol-aldehyde resin; said resin being derived by reaction between an anacardic acid phenol reactant and an aldehyde having not over 8 carbon atoms and reactive towards said phenolic reactant; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxypropylene radicals, and $n$ is a numeral varying from 1 to 20; with the proviso that at least 2 moles of alkylene oxide be introduced for each phenolic nucleus; said anacardic acid phenolic reactant being derived from the class consisting of (a) an anacardic acid phenol and the side chain chlorinated and the side chain hydrogenated derivatives thereof; (b) a minor proportion of the trifunctional phenol free from any meta substituent having more than 4 carbon atoms in admixture with a major proportion of the anacardic acid phenol specified in (a) preceding; (c) a difunctional phenol in admixture with an anacardic acid phenol described in (a) preceding in such proportions that there is at least one nucleus from each type of phenol per resin molecule; and (d) a major proportion of a mixture of (c) preceding, in combination with a minor proportion of a trifunctional phenol free from any meta position substituent having more than 4 carbon atoms the proportions being such that there is at least one anacardic acid phenol nucleus per resin molecule.

2. A process for breaking petroleum emulsions of the water-in-oil type, characterized by subjecting the emulsion to the action of a demulsifying agent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic-solvent-soluble, water-insoluble phenol-aldehyde resin; said resin being derived by reaction between an anacardic acid phenol reactant and an aldehyde having not over 8 carbon atoms and reactive towards said phenolic reactant; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxypropylene radicals, and $n$ is a numeral varying from 1 to 20; with the proviso that at least 2 moles of alkylene oxide be introduced for each phenolic nucleus; said anacardic acid phenolic reactant being derived from the class consisting of (a) an anacardic acid phenol and the side chain chlorinated and the side chain hydrogenated derivatives thereof; (b) a minor proportion of the trifunctional phenol free from any meta substituent having more than 4 carbon atoms in admixture with a major proportion of the anacardic acid phenol specified in (a) preceding; (c) a difunctional phenol in admixture with an anacardic acid phenol described in (a) preceding in such proportions that there is at least one nucleus from each type of phenol per resin molecule; and (d) a major proportion of a mixture of (c) preceding in combination with a minor proportion of a trifunctional phenol free from any meta position substitutent having more than 4 carbon atoms the proportions being such that there is at least one anacardic acid phenol nucleus per resin molecule; and with the final proviso that the hydrophile properties of said oxyalkylated resin in an equal weight of xylene are sufficient to produce an emulsion when said xylene solution is shaken vigorously with one to three volumes of water.

3. A process for breaking petroleum emulsions of the water-in-oil type, characterized by subjecting the emulsion to the action of a demulsifying agent including hydrophile synthetic products; said hydrophile synthetic products being oxyethylation products of (A) ethylene oxide, and (B) an oxyethylating-susceptible, fusible, organic solvent-soluble, water-insoluble phenol-aldehyde resin; said resin being derived by reaction between an anacardic acid phenol reactant and an aldehyde having not over 8 carbon atoms and reactive towards said phenolic reactant; said oxyethylated resin being characterized by the introduction into the resin molecule of a plurality of divalent radicals having the formula $(C_2H_4O)_n$ wherein $n$ is a numeral varying from 1 to 20; with the proviso that at least 2 moles of ethylene oxide be introduced for each phenolic nucleus; said anacardic acid phenolic reactant being derived from the class consisting of (a) an anacardic acid phenol and the side chain chlorinated and the side chain hydrogenated derivatives thereof; (b) a minor proportion of the trifunctional phenol free from any meta substituent having more than 4 carbon atoms in admixture with a major proportion of the anacardic acid phenol specified in (a) preceding; (c) a difunctional phenol in admixture with an anacardic acid phenol described in (a) preceding in such proportions that there is at least one nucleus from each type of phenol per resin molecule; and (d) a major proportion of a mixture of (c) preceding in combination with a minor proportion of a trifunctional phenol free from any meta position substituent having more than 4 carbon atoms the proportions being such that there is at least one anacardic acid phenol nucleus per resin molecule; and with the final proviso that the hydrophile properties of said oxyethylated resin in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifying agent including hydrophile synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between an anacardic acid phenol reactant and an aldehyde having not over 8 carbon atoms and reactive towards said phenolic reactant; said oxyethylated resin being characterized by the introduction into the resin molecule of a plurality of divalent radicals having the formula $(C_2H_4O)_n$ wherein $n$ is a numeral varying from 1 to 20; with the proviso that at least 2 moles of ethylene oxide be introduced for each phenolic nucleus; said anacardic acid phenolic reactant being derived from the class consisting of (a) an anacardic acid phenol and the side chain chlorinated and the side chain hydrogenated derivatives thereof; (b) a minor proportion of the trifunctional phenol free from any meta substituent having more than 4 carbon atoms in admixture with a major proportion of the anacardic acid phenol specified in (a) preceding; (c) a difunctional phenol in admixture with an anacardic acid phenol described in (a) preceding in such proportions that there is at least one nucleus from each type of phenol per resin molecule; and (d) a major proportion of a mixture of (c) preceding in combination with a minor proportion of a trifunctional phenol free from any meta position substituent having more than 4 carbon atoms the proportions being such that there is at least one anacardic acid phenol nucleus per resin molecule; and with the final proviso that the hydrophile properties of said oxyethylated resin in an equal weight of xylene are sufficient to produce an emulsion when said xylene solution is shaken vigorously with one to three volumes of water.

5. The process of claim 4, wherein the aldehyde is an aliphatic aldehyde.

6. The process of claim 4, wherein the aldehyde is formaldehyde.

7. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation susceptible, fusible, organic solvent-soluble, water-insoluble, low stage acid catalyzed phenol-formaldehyde resin having an average molecular weight corresponding to at least three and not over 7 phenolic nuclei per resin molecule; said resin being derived by reaction between an anacardic acid phenol reactant and formaldehyde; said oxyethylated resin being characterized by the introduction into the resin molecule of a plurality of radicals having the formula $(C_2H_4O)_n$ wherein $n$ is a numeral varying from 1 to 20; with the proviso that at least 2 moles of ethylene oxide be introduced for each phenolic nucleus; said anacardic acid phenolic reactant being derived from the class consisting of (a) an anacardic acid phenol and the side chain chlorinated and the side chain hydrogenated derivatives thereof; (b) a minor proportion of the trifunctional phenol free from any meta substituent having more than 4 carbon atoms in admixture with a major proportion of the anacardic acid phenol specified in (a) preceding; (c) a difunctional phenol in admixture with an anacardic acid phenol described in (a) preceding in such proportions that there is at least one nucleus from each type of phenol per resin molecule; and (d) a major proportion of a mixture of (c) preceding in combination with a minor proportion of a trifunctional phenol free from any meta position substituent having more than 4 carbon atoms the proportions being such that there is at least one anacardic acid phenol nucleus per resin molecule; and with the final proviso that the hydrophile properties of said oxyethylated resin in an equal weight of xylene are sufficient to produce an emulsion when said xylene solution is shaken vigorously with one to three volumes of water.

8. The process of claim 7, wherein the phenolic reactant is an anacardic acid phenol.

9. The process of claim 7, wherein the phenolic reactant is cashew nutshell liquid.

10. The process of claim 7, wherein the phenolic reactant is side chain chlorinated cashew nutshell liquid.

11. The process of claim 7, wherein the phenolic reactant is side chain hydrogenated cashew nutshell liquid.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,076,624 | De Groote | Apr. 13, 1937 |
| 2,243,330 | De Groote et al. | May 27, 1941 |
| 2,307,058 | Moeller | Jan. 5, 1943 |
| 2,454,541 | Bock et al. | Nov. 23, 1948 |